US008718100B2

(12) United States Patent
Markley et al.

(10) Patent No.: US 8,718,100 B2
(45) Date of Patent: May 6, 2014

(54) METHODS AND APPARATUS FOR SELECTING DIGITAL INTERFACE TECHNOLOGY FOR PROGRAMMING AND DATA DELIVERY

(75) Inventors: Jeffrey P. Markley, Golden, CO (US); Charles A. Hasek, Broomfield, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 2329 days.

(21) Appl. No.: 11/364,147

(22) Filed: Feb. 27, 2006

(65) Prior Publication Data

US 2007/0204300 A1    Aug. 30, 2007

(51) Int. Cl.
*H04J 1/00*    (2006.01)
*H04H 20/81*    (2008.01)

(52) U.S. Cl.
CPC .................................. *H04H 20/81* (2013.01)
USPC ........... 370/486; 370/389; 370/390; 370/419; 370/445; 370/464; 370/477; 370/480; 370/487; 370/505; 370/506; 709/224; 709/225; 709/231; 709/232; 709/233; 725/34; 725/46; 725/86; 725/87; 725/91; 725/100; 725/105; 725/114; 725/116; 725/120; 725/131

(58) Field of Classification Search
None
See application file for complete search history.

(56) References Cited

U.S. PATENT DOCUMENTS

| RE35,651 E | 11/1997 | Bradley et al. | |
|---|---|---|---|
| 5,793,410 A * | 8/1998 | Rao ............................... | 725/120 |
| 6,105,134 A | 8/2000 | Pinder et al. | |
| 6,124,878 A | 9/2000 | Adams et al. | |
| 6,175,856 B1 | 1/2001 | Riddle | |
| 6,216,152 B1 * | 4/2001 | Wong et al. .................... | 709/203 |
| 6,252,964 B1 * | 6/2001 | Wasilewski et al. .......... | 380/282 |
| 6,256,393 B1 | 7/2001 | Safadi et al. | |
| 6,337,715 B1 | 1/2002 | Inagaki et al. | |
| 6,516,412 B2 | 2/2003 | Wasilewski | |
| 6,594,699 B1 * | 7/2003 | Sahai et al. ................... | 709/228 |
| 6,725,459 B2 | 4/2004 | Bacon | |
| 6,728,269 B1 * | 4/2004 | Godwin et al. ............... | 370/477 |
| 6,745,245 B1 | 6/2004 | Carpenter | |
| 6,772,435 B1 | 8/2004 | Thexton | |
| 6,799,196 B1 | 9/2004 | Smith | |
| 6,948,183 B1 | 9/2005 | Peterka | |
| 6,961,430 B1 | 11/2005 | Gaske et al. | |
| 6,985,934 B1 * | 1/2006 | Armstrong et al. ........... | 709/219 |
| 7,010,801 B1 | 3/2006 | Jerding | |
| 7,024,461 B1 | 4/2006 | Janning | |
| 7,039,116 B1 | 5/2006 | Zhang et al. | |
| 7,039,169 B2 | 5/2006 | Jones | |

(Continued)

*Primary Examiner* — Faruk Hamza
*Assistant Examiner* — Aixa A Guadalupe-Cruz
(74) *Attorney, Agent, or Firm* — Gazdzinski & Associates, PC

(57) ABSTRACT

Methods and apparatus for selecting digital (network) interface technology for programming and data delivery over, e.g., a content-based network. In one embodiment, the network comprises an HFC cable or satellite network that includes a server process interfacing with a plurality of customer premises equipment (CPE), and/or associated client devices, each having different capabilities profiles. The server determines the one or more capabilities possessed by the CPE, and evaluates one or more program or content choices for possible delivery to that CPE based on its profile. The server generates a list of programs or content based on this evaluation, and transmits this list to the CPE, which displays the list for viewing by a user. The user is therefore offered a list of available content that is compatible with their specific configuration. A business and operational rules engine is also optionally employed to control the operation of the foregoing processes to accomplish particular business or operational goals.

27 Claims, 12 Drawing Sheets

(56) References Cited

U.S. PATENT DOCUMENTS

| | | |
|---|---|---|
| 7,039,614 B1 | 5/2006 | Candelore |
| 7,039,938 B2 | 5/2006 | Candelore |
| 7,058,387 B2 | 6/2006 | Kumar |
| 7,089,577 B1 | 8/2006 | Rakib |
| 7,093,272 B1 | 8/2006 | Shah-Nazaroff et al. |
| 7,103,906 B1 * | 9/2006 | Katz et al. ............ 725/87 |
| 7,107,462 B2 | 9/2006 | Fransdonk |
| 7,133,837 B1 | 11/2006 | Barnes, Jr. |
| 7,178,161 B1 | 2/2007 | Fristoe |
| 7,181,010 B2 | 2/2007 | Russ |
| 7,194,756 B2 | 3/2007 | Addington |
| 7,200,788 B2 | 4/2007 | Hiraki |
| 7,203,940 B2 | 4/2007 | Barmettler |
| 7,216,265 B2 | 5/2007 | Hughes |
| 7,225,164 B1 | 5/2007 | Candelore |
| 7,225,458 B2 | 5/2007 | Klauss |
| 7,257,650 B2 | 8/2007 | Maciesowicz |
| 7,266,198 B2 | 9/2007 | Medvinsky |
| 7,266,611 B2 | 9/2007 | Jabri |
| 7,266,726 B1 | 9/2007 | Ladd |
| 7,305,691 B2 | 12/2007 | Cristofalo |
| 7,434,245 B1 | 10/2008 | Shiga et al. |
| 7,617,516 B2 * | 11/2009 | Huslak et al. ............ 725/95 |
| 7,757,251 B2 | 7/2010 | Gonder |
| 2002/0019984 A1 | 2/2002 | Rakib |
| 2002/0032754 A1 | 3/2002 | Logston et al. |
| 2002/0049980 A1 | 4/2002 | Hoang |
| 2002/0053082 A1 | 5/2002 | Weaver et al. |
| 2002/0059619 A1 | 5/2002 | Lebar |
| 2002/0100059 A1 | 7/2002 | Buehl et al. |
| 2002/0196939 A1 | 12/2002 | Unger et al. |
| 2003/0021412 A1 | 1/2003 | Candelore et al. |
| 2003/0056217 A1 | 3/2003 | Brooks |
| 2003/0074565 A1 | 4/2003 | Wasilewski et al. |
| 2003/0088876 A1 | 5/2003 | Mao et al. |
| 2003/0095791 A1 | 5/2003 | Barton et al. |
| 2003/0135860 A1 | 7/2003 | Dureau |
| 2003/0161473 A1 | 8/2003 | Fransdonk |
| 2003/0217365 A1 | 11/2003 | Caputo |
| 2004/0045030 A1 | 3/2004 | Reynolds et al. |
| 2004/0123313 A1 | 6/2004 | Koo et al. |
| 2004/0181800 A1 * | 9/2004 | Rakib et al. ............ 725/25 |
| 2004/0187150 A1 | 9/2004 | Gonder |
| 2004/0193648 A1 | 9/2004 | Lai et al. |
| 2004/0193704 A1 | 9/2004 | Smith |
| 2004/0261114 A1 * | 12/2004 | Addington et al. ............ 725/106 |
| 2004/0261116 A1 | 12/2004 | Mckeown et al. |
| 2004/0267965 A1 * | 12/2004 | Vasudevan et al. ............ 709/250 |
| 2005/0039206 A1 | 2/2005 | Opdycke |
| 2005/0050160 A1 * | 3/2005 | Upendran et al. ............ 709/217 |
| 2005/0060758 A1 | 3/2005 | Park |
| 2005/0071669 A1 | 3/2005 | Medvinsky et al. |
| 2005/0071882 A1 | 3/2005 | Rodriguez et al. |
| 2005/0097598 A1 | 5/2005 | Pedlow et al. |
| 2005/0114900 A1 | 5/2005 | Ladd |
| 2005/0125528 A1 | 6/2005 | Burke et al. |
| 2005/0135476 A1 | 6/2005 | Gentric et al. |
| 2005/0289618 A1 * | 12/2005 | Hardin ............ 725/95 |
| 2006/0010075 A1 | 1/2006 | Wolf |
| 2006/0020984 A1 | 1/2006 | Ban et al. |
| 2006/0059098 A1 | 3/2006 | Major et al. |
| 2006/0059342 A1 | 3/2006 | Medvinsky et al. |
| 2006/0062059 A1 | 3/2006 | Smith et al. |
| 2006/0064728 A1 | 3/2006 | Son et al. |
| 2006/0073843 A1 | 4/2006 | Aerrabotu et al. |
| 2006/0084417 A1 * | 4/2006 | Melpignano et al. ............ 455/418 |
| 2006/0085824 A1 | 4/2006 | Bruck |
| 2006/0088063 A1 | 4/2006 | Hartung et al. |
| 2006/0130107 A1 | 6/2006 | Gonder |
| 2006/0130113 A1 | 6/2006 | Carlucci |
| 2006/0133398 A1 | 6/2006 | Choi et al. |
| 2006/0133644 A1 | 6/2006 | Wells et al. |
| 2006/0171390 A1 | 8/2006 | La Joie |
| 2006/0218604 A1 | 9/2006 | Riedl |
| 2006/0256376 A1 | 11/2006 | Hirooka |
| 2006/0271946 A1 | 11/2006 | Woundy |
| 2006/0291506 A1 | 12/2006 | Cain |
| 2007/0022459 A1 * | 1/2007 | Gaebel et al. ............ 725/114 |
| 2007/0047449 A1 | 3/2007 | Berger |
| 2007/0053293 A1 | 3/2007 | McDonald et al. |
| 2007/0061818 A1 | 3/2007 | Williams |
| 2007/0076728 A1 | 4/2007 | Rieger |
| 2007/0094691 A1 | 4/2007 | Gazdzinski |
| 2007/0121678 A1 | 5/2007 | Brooks |
| 2007/0124781 A1 | 5/2007 | Casey et al. |
| 2007/0130581 A1 | 6/2007 | Del Sesto |
| 2007/0153820 A1 | 7/2007 | Gould |
| 2007/0156539 A1 * | 7/2007 | Yates ............ 705/26 |
| 2007/0157234 A1 | 7/2007 | Walker |
| 2007/0162927 A1 | 7/2007 | Ramaswamy et al. |
| 2007/0204311 A1 | 8/2007 | Hasek et al. |
| 2007/0204314 A1 | 8/2007 | Hasek et al. |
| 2007/0271386 A1 | 11/2007 | Kurihara et al. |
| 2008/0098446 A1 | 4/2008 | Seckin et al. |

* cited by examiner

METHODS AND APPARATUS FOR SELECTING DIGITAL INTERFACE TECHNOLOGY FOR PROGRAMMING AND DATA DELIVERY

RELATED APPLICATIONS

This application is related to co-owned and co-pending U.S. patent application Ser. 11/363,578 entitled "METHODS AND APPARATUS FOR SELECTING DIGITAL ACCESS TECHNOLOGY FOR PROGRAMMING AND DATA DELIVERY", and U.S. patent application Ser. No. 11/363,577 entitled "METHODS AND APPARATUS FOR SELECTING DIGITAL CODING/DECODING TECHNOLOGY FOR PROGRAMMING AND DATA DELIVERY", both filed contemporaneously herewith, both incorporated herein by reference in their entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of information distribution across a network. More particularly, the present invention is related in one exemplary aspect to the distribution of information across a content-based and data network having a set of electronic devices with at least some heterogeneous capabilities.

2. Description of Related Technology

Digital Television

Digital TV (DTV) is a technology which utilizes digitized and compressed data formats (e.g., MPEG) for content transmission, as compared to earlier analog "uncompressed" approaches (e.g., NTSC). The DTV content may be distributed across any number of different types of bearer media or networks with sufficient bandwidth, including HFC, satellite, wireless, or terrestrial.

DTV broadcasts are generally more efficient and more flexible than analog methods. For example, the bandwidth required to transmit video programming using DTV is less than the bandwidth required using analog methods, assuming similar quality of video (and audio). Thus, more video programming can generally be transmitted with a given bandwidth when DTV methods are employed.

DTV standards such as the OpenCable™ Application Platform (OCAP) middleware specification (e.g., Version 1.0, and Version 2.0) require that applications be downloaded to host devices from the bearer or broadcast network in real-time. The OCAP specification is a middleware software layer specification intended to enable the developers of interactive television services and applications to design such products so that they will run successfully on any cable television system in North America, independent of set-top or television receiver hardware or operating system software choices.

The aforementioned OpenCable standard also sets forth a Host Core Functional Requirements specification which defines optional circuitry for digital video recorders (DVRs), and digital video interfaces (DVIs); see, e.g., the OpenCable Host Device Core Functional Requirements OC-SP-HOST-CFR-I13-030707 specification (now OC-SP-HOST-CFR-I14-030905 dated Sep. 5, 2003).

DVR technology provides selective recording, playback, and manipulation (e.g., storage, processing, editing, etc.) of digital format content. For example, the services offered by the Assignee hereof in conjunction with exemplary Scientific Atlanta Explorer 8000 Digital Video Recorder set top box equipment (and associated high capacity mass storage device) are representative of this technology.

Personal video recording (PVR) functionality is essentially a subset of DVR technology, wherein individual users, e.g., family members within the same household, can selectively record digital content particular to their choosing while not inhibiting other individuals from doing the same. This provides significant flexibility and enhances the user experience, since each individual can tailor their viewing as desired.

DVI technology allows, inter alia, for the seamless integration of digital TV and digital-based devices with analog devices, such as analog televisions. Accordingly, if the user possesses an analog monitor, the DVI selectively converts the otherwise digital signal to the analog domain. Accordingly, the user (and manufacturer) need not selectively tailor their equipment to a particular domain.

This equipment may be leased from the content/network operator, or alternatively purchased "retail" from a third party manufacturer. Clearly, it is desired to have programming and software applications distributed by the network operator (or third-party content provider) be compatible with the hardware/software environments of these CPE, thereby avoiding situations where a downloaded content or application does not function properly, which can greatly add to user frustration.

Video-On-Demand (VOD)

Providing "on-demand" (OD) services, such as video on-demand or VOD, is also well known in the prior art. In a typical configuration, the VOD service makes available to its users a selection of multiple video programs that they can choose from and watch over a network connection with minimum setup delay. At a high level, a VOD system consists of one or more VOD servers that store the relevant content; one or more network connections that are used for program selection and program delivery; and customer premises equipment (CPE) to receive, decode and present the video on a display unit. In a cable network, the content is typically distributed over a Hybrid Fiber Coaxial (HFC) network.

Depending on the type of content made available and rate structure for viewing, a particular VOD service could be called "subscription video-on-demand (SVOD)" that gives customers on-demand access to the content for a flat monthly fee, "free video-on-demand (FVOD)" that gives customers free on-demand access to some content, "movies on-demand" where VQD content consists of movies only, and so forth. Many of these services, although referred to by names different than VOD, still share many of the same basic attributes including storage, network and decoder technologies.

Just as different varieties of VOD service offerings have evolved over time, several different network architectures have also evolved for deploying these services. These architectures range from fully centralized (e.g., VOD servers at a central location) to fully distributed (e.g., multiple copies of content distributed on VOD servers very close to customer premises), as well as various other network architectures there between. Since most cable television networks today consist of optical fiber towards the "core" of the network which are connected to coaxial cable networks towards the "edge", VOD transmission network architectures also consist of a mixture of optical fiber and coaxial cable portions.

The CPE for VOD often consists of a digital cable set-top box (DSTB) that provides the functions of receiving cable signals by tuning to the appropriate RF channel, processing the received signal and outputting VOD signals for viewing on a display unit. Such a digital set-top box also typically hosts a VOD application that enables user interaction for navigation and selection of VOD menu.

While the architectural details of how video is transported in the core HFC network can be different for each VOD deployment, each generally will have a transition point where the video signals are modulated, upconverted to the appropriate RF channel and sent over the coaxial segment(s) of the network. Depending on the topology of the individual cable plant, this could be performed at a node, hub or a headend. The coaxial cable portion of the network is variously referred to as the "access network" or "edge network" or "last mile network."

In U.S. cable systems for example, downstream RF channels used for transmission of television programs are 6 MHz wide, and occupy a 6 MHz spectral slot between 54 MHz and 860 MHz. Deployments of VOD services have to share this spectrum with already established analog and digital cable television services. For this reason, the exact RF channel used for VOD service may differ from plant to plant. However, within a given cable plant, all homes that are electrically connected to the same cable feed running through a neighborhood will receive the same downstream signal. For the purpose of managing VOD services, these homes are grouped into logical groups typically called Service Groups. Homes belonging to the same Service Group receive their VOD service on the same set of RF channels.

Emerging Technologies and Challenges

A broad variety of electronic devices have recently been developed to utilize and leverage emerging information delivery capabilities. Increasingly, these devices are being equipped with DVI (and DVR/PVR) technology. The devices often have very different capabilities, and may include e.g., digital set-top boxes (DSTBs), personal computers (PCs), personal digital assistants (PDAs), hand-held computers, "smartphones", personal media devices (PMDs), etc.

These devices can be operatively coupled to, and placed in communication with, other devices (whether of the same or different configuration), or other network entities such as a central information source or server via various channels. The different capabilities of these electronic devices may result from different purposes, designs, different user configuration, being mobile versus fixed in nature, cost/features, etc., and may include differing encryption support capabilities, conditional access profiles, memory and/or processing capability, video or audio codecs, network interfaces, and so forth. Many of these features, including notably the conditional access (CA), codec, and network interface capabilities, are critical to the proper selection, delivery, and playing of content at the end-user device.

The traditional method of digital compression is the well-known MPEG-2 format. More advanced codecs include H.264 (also known as MPEG-4) and VC-1. H.264 is a high compression digital video codec standard written by the ITU-T Video Coding Experts Group (VCEG) together with the ISO/IEC Moving Picture Experts Group (MPEG) as the product of a collective partnership effort known as the Joint Video Team (JVT). The ITU-T H.264 standard and the ISO/IEC MPEG-4 Part-10 standard (formally, ISO/IEC 14496-10) are highly similar, and the technology is also known as AVC, for Advanced Video Coding. DTV methods of program distribution are also generally more flexible than analog methods. For example, the type of compression may be modified or updated. The compression can be improved when new techniques become available, or they may be customized or optimized for certain applications and attributes such as picture quality, data integrity or transmission delay.

Conditional access (CA) technologies may also be incorporated into the digital encoding of various types of data including audio and video programming. Conditional access can generally be defined as the control of when and how a user may view and use the associated programming or information. Different types of conditional access may be desirable in a network delivery system in order to, e.g., accommodate improvements in the technology as well as different conditional access attributes such as security and category of programming or user access level.

A traditional method of conditional access is known as "Powerkey". Newer methods of conditional access include Powerkey Book 2, Powerkey Book 3, NDS, ANSI/SCTE 52 2003 (DVS-042), and DigiCipher. These can be implemented using, for example, the so-called "CableCard" plug-in security module access technology. See, e.g., the CableCard-Host interface specification, which defines the interface between a digital cable receiver or STB (Host device) and the CableCard device provided by the MSO/cable operator.

More recently, emerging technologies have focused on downloadable conditional access system (DCAS), which is intended to be implemented in next-generation two-way, cable-ready digital TV sets, set-top boxes and/or other TV-related devices. This "download" approach would enable cable operators to download conditional access software directly to TV sets, set-top boxes and other digital entertainment devices in the subscribers' premises, and would be especially suited to interactive services such as VOD, PVR, etc. This would also obviate the physical CableCard form factor.

End-user devices may also include a variety of interfaces. For example, a set-top box might have an RF tuner in order to receive QAM signals over the cable. A cable modem similarly receives DOCSIS QAM signals over the cable, but on different channels, and hence requires a separate tuning mechanism. Other types of potential interfaces include Ethernet (LAN, WAN, etc.), and even wireless technologies such as satellite, millimeter wave, WiFi (IEEE-802.11), WiMax (IEEE-802.16), and PAN (IEEE-802.15).

As client devices with different codec/compression, conditional access, and/or network interface capabilities are added to a network, the distribution of programming and other information over the network becomes more complex. For example, a video server system within a cable or satellite content network must take into account the compression and conditional access technology available at the receiving system before delivering that programming.

The capabilities of the receiving system must also be taken into account when providing directories of available programming. It is important that only compatible programming is displayed in a programming directory so that users don't attempt to watch programs that are only available in formats that are incompatible with their equipment. This can lead to significant user frustration and loss of satisfaction.

Within the network, content may also be delivered to many devices outside of traditional STBs as well as being delivered to the STBs directly. Each such device may support different encryption and decode abilities.

In some cases, the preferred delivery method may also have to be determined before delivery of the programming. That is, the programming might be delivered by normal "in-band" RF channels, or by packet-based networks such as the Internet (e.g., via a cable modem).

Without the ability to determine the capabilities and network environment of each of the client devices on the network, many of the benefits that arise from the use of DTV, including advanced compression techniques, enhanced conditional access capabilities, and flexibility in choice of delivery channel or mode, will not be fully realized.

A variety of different technologies generally relating to conditional access, codec operation, and network interface capabilities, are evidenced in the prior art. For example, U.S. Pat. No. 6,105,134 to Pinder, et al. issued on Aug. 15, 2000 and entitled "Verification of the source of program information in a conditional access system" discloses a cable television system which provides conditional access to services. The cable television system includes a headend from which service "instances", or programs, are broadcast and a plurality of set top units for receiving the instances and selectively decrypting the instances for display to system subscribers. The service instances are encrypted using public and/or private keys provided by service providers or central authorization agents. Keys used by the set tops for selective decryption may also be public or private in nature, and such keys may be reassigned at different times to provide a cable television system in which piracy concerns are minimized.

U.S. Pat. No. 6,175,856 to Riddle, issued Jan. 16, 2001 and entitled "Method and apparatus for dynamic selection of compression processing during teleconference call initiation" describes a digital processing system and method which controls selection of a compressor in a communication system. In one embodiment, the method comprises receiving at the digital processing system information from a communication port, which information identifies decompression processing capabilities at a remote processor, and selecting in response to the information a particular compression process for use in compressing data for transmission to the remote processor.

U.S. Pat. No. 6,216,152 to Wong, et al. issued Apr. 10, 2001 and entitled "Method and apparatus for providing plug in media decoders" discloses a method and apparatus for providing plug-in media decoders. Embodiments provide a "plug-in" decoder architecture that allows software decoders to be transparently downloaded, along with media data. User applications are able to support new media types as long as the corresponding plug-in decoder is available with the media data. Persistent storage requirements are decreased because the downloaded decoder is transient, existing in application memory for the duration of execution of the user application. The architecture also supports use of plug-in decoders already installed in the user computer. One embodiment is implemented with object-based class files executed in a virtual machine to form a media application. A media data type is determined from incoming media data, and used to generate a class name for a corresponding codec (coder-decoder) object. A class path vector is searched, including the source location of the incoming media data, to determine the location of the codec class file for the given class name. When the desired codec class file is located, the virtual machine's class loader loads the class-file for integration into the media application. If the codec class file is located across the network at the source location of the media data, the class loader downloads the codec class file from the network. Once the class file is loaded into the virtual machine, an instance of the codec class is created within the media application to decode/decompress the media data as appropriate for the media data type.

U.S. Pat. No. 6,256,393 to Safadi, et al. issued on Jul. 3, 2001 and entitled "Authorization and access control of software object residing in set-top terminals" discloses a method for providing authentication, authorization and access control of software object residing in digital set-top terminals creates a fingerprint ("signature") for each software object, associates each fingerprint with a service tier, encodes each association and creates an association table containing the information and downloads the association table to the digital set-top terminal. In addition, the method utilizes an entitlement management message, sent to each set-top terminal, indicating what software objects the set-top terminal may utilize, and provides a system routine at the digital set-top terminal that is invoked whenever software object is about to be utilized. The entitlement management message contains the access rights given to a particular set-top terminal, which must match the software object's access requirements for the software object to be utilized. The entitlement management message may also contain set-top terminal resource control access rights that a given software object may utilize. When the software object requires the utilization of a set-top resource, a second conditional access routine may be invoked to determine the authorization rights for using the resource. Measures to protect such means are also described. As such the method provides multiple system cable operators (MSO's) with additional capabilities to maintain secure control of features and applications running on their networks and within the associated set-top terminals.

U.S. Pat. No. 6,745,245 to Carpenter issued on Jun. 1, 2004 and entitled "Managing access to set-top box objects using television conditional access system" discloses methods for using a conditional access system to modify access control information maintained at a set-top box or another client system. The access control information regulates the availability of information or entertainment services at the client or controls the ability of scripts executed at the client to access objects defined at the client. The conditional access system can be a conventional conditional access, such as those used by cable television providers, that has been adapted to modify the access control information. The access control information includes multiple entries, each being referenced by a token identifier. The conditional access system transmits a command and an accompanying token to the client to instruct the client how to modify the access control information. The entry that is to be modified is identified by comparing the token with the token identifiers. By modifying access control information in this manner, the entity that operates the conditional access system is capable of regulating the availability of resources or services at the client. For example, a selected level of a tiered information service can be made available to the client.

U.S. Pat. No. 6,799,196 to Smith, issued Sep. 28, 2004 and entitled "On-demand data streaming parceling" describes a method where a client device, or information appliance such as a personal digital assistant, is capable of receiving multimedia data streams from a server. However, due to processing and display capabilities, the client device may not be able to present the complete data stream, or a user may elect to configure the client device not to process data that will unduly reduce the client device's performance. Accordingly, the invention provides a method and apparatus for allowing a server to determine the native, or user selected, capabilities of a client device, such that the server can filter and parse the data into meaningfully presentable data and non-meaningfully presentable data, and then transmit only the meaningfully presentable data to the client device for processing and display. In an alternative embodiment, the server sends the complete data stream to the client device, and the client device filters and parses the data, and then processes only the meaningfully presentable data for display on the client device.

U.S. Pat. No. 6,985,934 to Armstrong. et al. issued Jan. 10, 2006 and entitled "Method and system for providing rich media content over a computer network" describes a method and system for providing rich media content over a computer network. In accordance with the invention, a server on a physical or wireless computer network polls the software, hardware, or appliance of an end user on the network, for the availability of software and/or hardware necessary for the display of rich media content. This polling is transparent to the end user and requires no action on the part of the end user. Based on the client's response, the server sends an appropriately formatted version of the rich media file. The user is not necessarily aware that this transfer is taking place, as it is taking place in the background, while the user is performing other tasks or viewing content other than that which is being transferred. Once the rich media has been transferred in its entirety and stored, or cached, in the local memory of the client, the rich media content is displayed automatically in a designated display area. The user may then be able to manipulate the rich media content without affecting the other content or tasks that were being displayed prior to the display of the rich media content.

United States Patent Publication No. 20020032754 to Logston, et al. published Mar. 14, 2002 entitled "Method and apparatus for profiling in a distributed application environment" and incorporated herein by reference in its entirety, discloses a method and apparatus for deriving and characterizing the resource capabilities of client devices in a distributed application (DA) network environment. In a first aspect of the invention, a method and associated architecture for obtaining client device configuration and resource information are disclosed which incorporate a distributed profiling entity having a server portion and client portion, the client portion being used to facilitate query of the client device, and transfer of device resource and configuration information back to the server portion. This information is later used by the profiling entity to alter and update the distribution of entity components between the server and client device. The client device configuration may also be altered if required. In a second aspect of the invention, a method of scaling the aforementioned distributed profiling entity during both initial download and after initiation is disclosed.

United States Patent Publication No. 20020196939 to Unger, et al. published on Dec. 26, 2002 and entitled "Decoding and decryption of partially encrypted information" discloses an encryption arrangement for multiple encryption of television programs. A system according to embodiments of the present invention multiple encrypts only a portion of the data required for full presentation of a television program to permit coexistence of multiple conditional access encryption systems associated with multiple manufacturer's set-top boxes within a single system. By only encrypting a portion of the program, less bandwidth is consumed than the alternative of multiple encryption of all program data, thus permitting a larger number of programs to be carried over the same bandwidth while permitting coexistence of multiple conditional access systems in a single cable television system.

United States Patent Publication No. 20030021412 to Candelore, et al. published on Jan. 30, 2003 and entitled "Partial encryption and PID mapping" discloses an encryption arrangement for multiple encryption of television programs. A system according to embodiments of the present invention multiple encrypts only a portion of the data required for full presentation of a television program to permit coexistence of multiple conditional access encryption systems associated with multiple manufacturer's set-top boxes within a single system. PID mapping techniques are used to distinguish between multiple encryptions. By only encrypting a portion of the program, less bandwidth is consumed than the alternative of multiple encryption of all program data, thus permitting a larger number of programs to be carried over the same bandwidth while permitting coexistence of multiple conditional access systems in a single cable television system.

United States Patent Publication No. 20040123313 to Koo, et al. published on Jun. 24, 2004 and entitled "Method for updating key in DCATV conditional access system" discloses an invention which properly updates a key in various situations in order to secure liability of a service in a conditional access system for a digital cable television service. A method for updating a key in a conditional access system of a digital cable television service includes the step of receiving a request of changing service from a point of deployment (POD) module of subscriber having bidirectional or simplex receiver, changing a service at the head/end and sending an entitlement management message (EMM) having a changed key from the head/end to the point of deployment (POD) module.

Deficiencies of the Prior Art

Despite the foregoing plethora of prior art relating to CA, codec, and network interface technology, there is a salient need for improved methods and apparatus able to readily identify the different capabilities of two or more heterogeneous client devices on a network during the delivery of digital programming and other information, and make dynamic and effective use of this information. This includes, inter alia, addressing the lack of facility in prior art client or consumer premises devices for dynamically determining available: (i) conditional access system support; (ii) codec support, and (iii) supported network interfaces.

As previously noted, new client or consumer premises devices may utilize any number of different conditional access types, codecs, and/or network interfaces, and hence some mechanism is needed for conveying a device's capabilities to an appropriate network entity, wherein decisions can be made in real time as to how to encrypt content before it is delivered to the device, how to compress/encode it, and over which channels to deliver it. Additionally, user or subscriber expectations must be managed so that electronic program guides (EPGs) or other such listings of available programs contain only those programs or content elements that are compatible with that user's client device.

Such improved methods and apparatus would also ideally be implemented using substantially existing infrastructure, thereby obviating significant modifications or expense in implementing such capability.

Such improved methods and apparatus would further ideally allow for commonalities or other aspects of client device configuration or operation to be identified within the network or segments thereof, so that these commonalities or aspects could be leveraged to provide a benefit, such as in terms of optimizing network operation by reducing bandwidth requirements or loading.

Moreover, these methods and apparatus could be "self-healing" from the standpoint that any errors or deficiencies (in terms of capabilities) within a given network client device could be readily identified and rapidly corrected if desired, thereby avoiding user frustration at being unable to receive and view certain content.

SUMMARY OF THE INVENTION

The foregoing needs are satisfied by the present invention, which discloses, inter alia, methods and apparatus for selecting appropriate digital technology for programming and data delivery over a network.

In a first aspect of the invention, a system for distributing video programming on-demand is disclosed. In one embodiment, the system comprises: a plurality of video signal processing devices, each the device having a plurality of network interface capabilities and further being configured to generate a capabilities profile relating at least in part to the network interface capabilities, and receive video programming signals; a video-on-demand server configured to receive the capabilities profile from individual ones of the devices and identify on-demand video programming that is compatible with individual ones of the capabilities profiles; and a network connecting the set of video signal processing devices to the video on-demand server, and capable of transmitting the capabilities profiles and information relating to the identified compatible on-demand video programming between the video signal processing devices and the video on-demand server over a network interface compatible with the network interface capabilities identified in the profile.

In one variant, the identification of on-demand programming by video-on-demand server comprises evaluating: (i) data decoding capabilities; and (ii) conditional access capabilities. In another variant, the identification of on-demand programming by video-on-demand server comprises evaluating the plurality of network interface capabilities for sufficient bandwidth for delivery of the video programming.

In a second aspect of the invention, a method of operating client equipment in communication with a content-based network is disclosed. In one embodiment, the equipment comprises a plurality of supported network interface options and at least one application, and the method comprises: running the at least one application; providing at least one hardware or software interface capable of communication with the network interface options; discovering the network interface options; and reporting the network interface options to a process. The network interface options may comprise, without limitation: (i) one of a plurality of RF tuners, (ii) an Ethernet interface, and (iii) a wireless interface.

In a third aspect of the invention, a method for operating a video processing device for use in a content-based network is disclosed. In one embodiment, the method comprises: polling a set of components of the video processing device for network interface capabilities (e.g., in-band RF tuners, a cable modem, and/or a high-speed serialized bus); receiving a plurality of network interface capabilities in response to the polling; and generating information describing the network interface options supported. In one variant, the method further comprises transmitting a session-based protocol message to a session resource manager (SRM) located on the content-based network remote from the video processing device. The session-based protocol comprises: a descriptor parameter describing a particular resource descriptor; a descriptor length parameter; and a data field.

In a fourth aspect of the invention, apparatus for receiving digital information from a network is disclosed. In one embodiment, the digital information is encoded, and the apparatus comprises: a microprocessor for running software modules; a plurality of network interface components, each comprising a substantially distinct communication channel; an application for determining a network interface profile; and an operating system for communicating with the plurality of network interface components in order to generate information for the network interface profile.

In a fifth aspect of the invention, network server apparatus is disclosed. In one embodiment, the server apparatus comprises: a processor; a storage device in data communication with the processor; and a computer program configured to run on the processor, the program being adapted to: receive network interface profile information from at least one network client device; determine at least one content element delivery option compatible with the profile information; and generate information for transmission to the at least one client device relating to the at least one content element delivery option. In one variant, the apparatus is further adapted to: identify when two or more of the at least one client devices have at least one common network interface capability; and invoke a bandwidth-conserving content delivery mechanism to at least the two or more devices. The bandwidth-conserving content delivery mechanism may comprises, for example a multicast transmission using a packetized network protocol.

In a sixth aspect of the invention, a method of configuring programming deliverable over a network is disclosed. In one embodiment, the programming is available for on-demand viewing by at least one CPE, and the method comprises: receiving from the at least one CPE first information relating to at least one network interface over which the programming is to be delivered; receiving from the at least one CPE second information relating to at least one of: (i) the decoding capabilities, or (ii) the conditional access (CA) capabilities, of the at least one CPE; selecting at least one of a plurality of variants of the programming based at least in part on the second information; and transmitting the selected variant of the programming over the at least one network interface based at least in part on the first information.

In a seventh aspect of the invention, a method of doing business over a cable television network is disclosed. In one embodiment, the method comprises: receiving first information relating to the network interface capabilities of a plurality of CPE operatively communicating with the network; receiving second information relating to the respective subscription level of subscribers associated with the plurality of CPE; and selecting, based at least in part on the first and second information, one of a plurality of network interfaces for delivery of content to each of the plurality of CPE.

In an eighth aspect of the invention, a method of operating a network is disclosed. In one embodiment, the network comprises a broadcast switched content delivery network having a node and a switching mechanism controlling delivery of programs to the node, and the method comprises: providing a plurality of programs to the switching mechanism; obtaining first information relating to the network interface capabilities of particular client devices serviced by the node; obtaining second information relating to program requests from the plurality of client devices; and based at least in part on the first and second information, selectively switching at least one of the programs for delivery to the node using at least the switching mechanism. In one variant, the method further comprises obtaining third information relating to at least one of the decoding or conditional access capabilities of the client devices; the selective switching is further based at least in part on the third information.

These and other aspects of the invention shall become apparent when considered in light of the disclosure provided below.

DETAILED DESCRIPTION OF THE INVENTION

Figure 1:
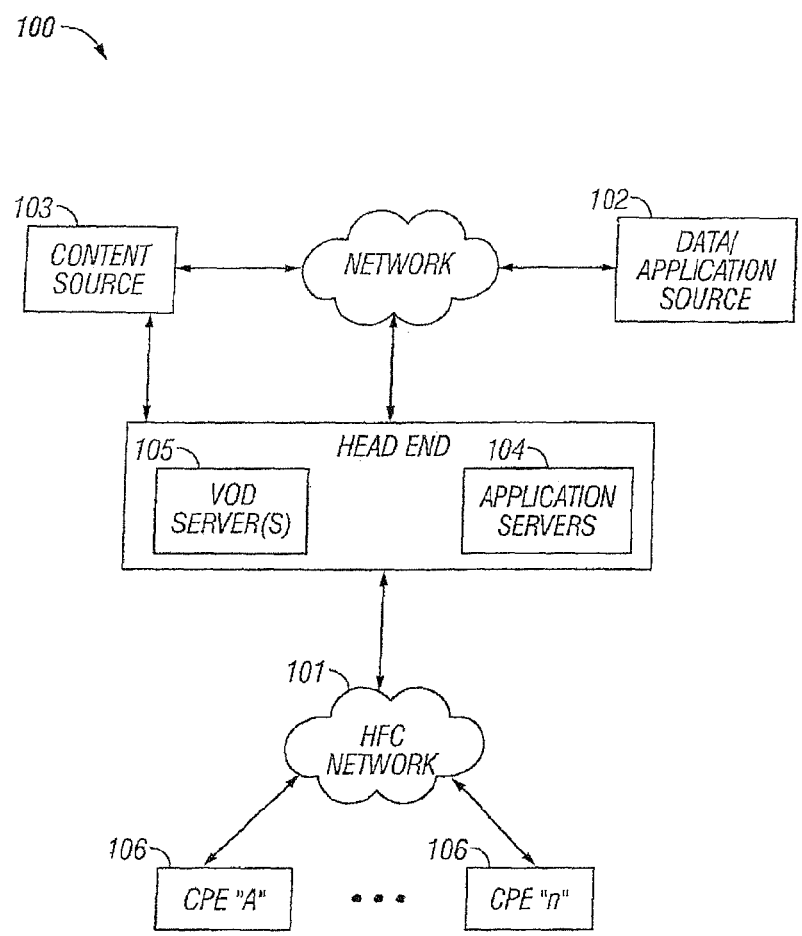
FIG. 1 is a functional block diagram illustrating an exemplary HFC network configuration useful with the present invention.

Reference is now made to the drawings wherein like numerals refer to like parts throughout.

As used herein, the term "application" refers generally to a unit of executable software that implements theme-based functionality The themes of applications vary broadly across any number of disciplines and functions (such as e-commerce transactions, brokerage transactions, mortgage interest calculation, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "computer program" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "middleware" refers to software that generally runs primarily at an intermediate layer in a software or protocol stack. For example, middleware may run on top of an operating system and platform hardware, and below applications.

The term "component" refers generally to a unit or portion of executable software that is based on a related set of functionalities. For example, a component could be a single class in Java™ or C++.

As used herein, the term "process" refers, without limitation, to executable software; e.g., that runs within its own CPU environment. A server process is an executable software process that serves various resources and information to other processes (clients) that request them.

As used herein, the term "DTV Network Provider" refers to a cable, satellite, or terrestrial network provider having infrastructure required to deliver services including programming (e.g., digital TV) and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, intemets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, DSM-CC, RTSP, UDP, FTP, RTP/RTCP, TCP/IP, H.323, etc.).

As used herein, the term "head-end" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the terms "client device" and "end user device" include, but are not limited to, personal computers (PCs) and minicomputers, whether desktop, laptop, or otherwise, set-top boxes such as the Motorola DCT2XXX/5XXX and Scientific Atlanta Explorer 2XXX/3XXX/4XXX/8XXX series digital devices, personal digital assistants (PDAs) such as the RIM Blackberry®, "Palm®" family of devices, handheld computers, personal communicators such as the Motorola Accompli devices, Motorola Ojo SIP phone, J2ME equipped devices, cellular telephones and smartphones, personal music or media devices, or literally any other device capable of interchanging data with a network.

Similarly, the terms "Consumer Premises Equipment (CPE)" and "host device" refer to any type of electronic equipment located within a consumer's or user's premises and connected to a network. The term "host device" refers generally to a terminal device that has access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), personal media devices (PMDs), and ITV Personal Computers.

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a CPE or other device.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

The term "processor" is meant to include any integrated circuit or other electronic device (or collection of devices) capable of performing an operation on at least one instruction including, without limitation, reduced instruction set core (RISC) processors, CISC microprocessors, microcontroller units (MCUs), CISC-based central processing units (CPUs), and digital signal processors (DSPs). The hardware of such devices may be integrated onto a single substrate (e.g., silicon "die"), or distributed among two or more substrates. Furthermore, various functional aspects of the processor may be implemented solely as software or firmware associated with the processor.

As used herein, the term "DVR"(digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "DVI"(digital video interface) refers generally to any type of interface (e.g., hardware and/or software) adapted to provide interface and/or conversion between different formats or domains, including without limitation interfaces compliant with the Digital Display Working Group (DDWG) DVI specification (e.g., DVI-A, DVI-D, and DVI-I).

As used herein, the term "video" is meant to generally include, without limitation, audio and/or video and other associated multimedia information that comprise content, such as for example an on-demand program. Exemplary types of services and models for providing such video include, without limitation, Video-On-Demand (VOD), IPTV, "Video To Go", and network personal video recorder (NPVR).

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "conditional access" refers to any access control scheme, whether implemented in hardware, software, or firmware (or combinations thereof), including without limitation members of the "Powerkey" family (Powerkey Book 2, Powerkey Book 3, etc.), NDS (including VideoGuard, mVideoGuard, etc.), ANSI/SCTE Standard 52 2003 (DVS-042), incorporated herein by reference in its entirety, and Motorola/General Instrument DigiCipher® family (DigiCipher II, etc.). These can be implemented using, for example, the so-called "CableCard" plug-in security module access technology, a downloadable CA system (DCAS), or otherwise.

As used herein, the term "network interface" refers to any signal or data interface with a component or network including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, SerialATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

Overview

The present invention provides, inter alia, improved apparatus and methods for the management and control of electronic devices connected to a network. In one embodiment, the network comprises an HFC cable or satellite network, and the electronic devices comprise set-top boxes, PMDs, or other types of equipment containing one or more hardware and software functions or modules. The hardware and software functions/modules of the different devices on the network contain various capabilities and options, including conditional access capabilities, video coding or compression capabilities, encryption schema, and network interfaces. These capabilities are utilized as a basis for determining which conditional access, coding, encryption, and/or network interfaces to utilize for delivery of content to each particular client device.

The present invention is advantageously adaptable to literally any type of session environment or protocol, as well as broadcast switched networks and other paradigms. In one embodiment, the network is capable of video-on-demand (VOD) delivery, and includes a VOD server and associated session resource manager (SRM) that acts to select and deliver the desired content to each subscriber in a device-specific fashion based on sessions established between the server and client.

In another embodiment, the client device is used to provide at least a portion of analysis of its own capabilities, as well as selection of suitable content compatible with those capabilities.

In yet another embodiment, the network comprises a broadcast switched architecture (BSA), and the client device information is used as a basis for hub/node switching decisions.

The improved methods and apparatus of the invention are readily implemented using substantially existing infrastructure, thereby obviating significant modifications or expense in implementing such capability.

These apparatus and methods are also optionally configured to identify commonalities or other aspects of client device configuration or operation, so that these commonalities or aspects can be leveraged to provide inter alia, optimization of network operation by reducing bandwidth requirements or loading.

The disclosed methods and apparatus are also substantially "self-healing" from the standpoint that any errors or deficiencies (in terms of capabilities) within a given network client device can be readily identified and rapidly corrected if desired, such as where codecs or applications are downloaded directly to a client device in order to provide it with additional functionality.

An operational and business rules "engine" useful in implementing various network policies is also disclosed.

Detailed Description of Exemplary Embodiments

Exemplary embodiments of the apparatus and methods of the present invention are now described in detail.

While these exemplary embodiments are described in the context of the aforementioned hybrid fiber coax (HFC) cable system architecture having an multi-systems operator (MSO), digital networking capability, and plurality of client devices/CPE, the general principles and advantages of the invention may be extended to other types of networks and architectures, whether broadband, narrowband, wired or wireless, or otherwise, the following therefore being merely exemplary in nature. For example, these techniques can readily be employed in the context of a broadband satellite network, or even a mobile communications system such as that described in co-pending and co-owned U.S. patent application Ser. No. 11/258,229 filed Oct. 24, 2005 and entitled "Method and Apparatus For On-Demand Content Transmission and Control Over Networks", which is incorporated herein by reference in its entirety.

It will also be appreciated that while described generally in the context of a network providing service to a customer (i.e., home) end user domain, the present invention may be readily adapted to other types of environments including, e.g., commercial/enterprise, and government/military applications.

System Architecture

FIG. 1 illustrates a high-level diagram of a typical content-based network configuration with which the conditional access determination and selection methodologies of the present invention may be used. The various components of the network 100 include (i) one or more data and application origination points 102; (ii) one or more content or program sources 103; (iii) one or more application/data/content distribution servers 104; (iv) one or more VOD servers 105, and (v) consumer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the head-end architecture of FIG. 1a (described in greater detail below) may be used.

The application origination point 102 comprises any medium that allows an application (such as a data download application or VOD-based application) to be transferred to a distribution server 104. This can include for example an application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The content source 103 may comprise any indigenous (i.e., MSO) or third party provider of content, whether direct or indirect. This content may comprise an MPEG (e.g., MPEG-2, MPEG-4, etc.) stream, or otherwise. The content may also pass through one or more intermediary nodes or conditioning process before transmission over the network 101, as is well understood in the art.

The application distribution server 104 comprises a computer system where such applications can enter the network system. Distribution servers are well known in the networking arts, and accordingly not described further herein.

The VOD server 105 a computer system where on-demand content, as well as the data discussed in greater detail below) can be received from one or more data sources 102 and enter the network system. These sources may generate the content/data locally, or alternatively act as a gateway or intermediary from a distant source. In one embodiment, the VOD server 105 includes the Session Resource Manager (SRM) functionality, and asks the Digital Network Control System (DNCS) for resources. The DNCS responds with negative or positive response to the request, and the VOD server implements the appropriate resource allocation logic. For example, when a new VOD session request is made, the SRM receives that request, allocates bandwidth on a downstream QAM channel, and sends the information back to the CPE that made the request so that it can tune to the right RF channel and the VOD program therein. Since the SRM controls mapping of incoming VOD session requests to QAM channels within the Service Group, it is an appropriate place for a Cable Operator to enforce RF channel usage and other policies, including CA. In general, SRM should maximize availability of bandwidth to VOD sessions (by efficiently recycling bandwidth from expired sessions) and by ensuring some level of redundancy in case of equipment failure (e.g. a QAM modulator fails).

It will be appreciated that while several exemplary embodiment of the invention are described in the content of an SRM closely associated with a VOD server, (i) the SRM may be located outside of or at a location separate from the VOD server (such as, e.g., on a LAN or WAN in data communication with the VOD server or its proxy); and (ii) one or more entities other than an SRM may be used to provide the described functionality. See, e.g., the discussion of the broadcast switched architecture (BSA) embodiments described subsequently herein.

The CPE 106 includes any equipment in the "customers' premises" (or other locations, whether local or remote to the distribution server 104) that can be accessed by a distribution server 104. Such CPE 106 comprise processors and associated computer memory (and optionally mass storage) adapted to store and run the downloaded or resident application, as well as receive and store the streamed in-band content and data. In the present context, at least a portion of the CPE application necessary to facilitate conditional access can itself be downloaded to the CPE 106, wherein the latter executes the downloaded application(s)/components in order to enable the CPE to receive appropriate types of data, although it will be recognized that the application(s) may also be resident on the CPE before download, received from another source (such as a third party Internet site, CD-ROM, etc.).

Figure 1A:
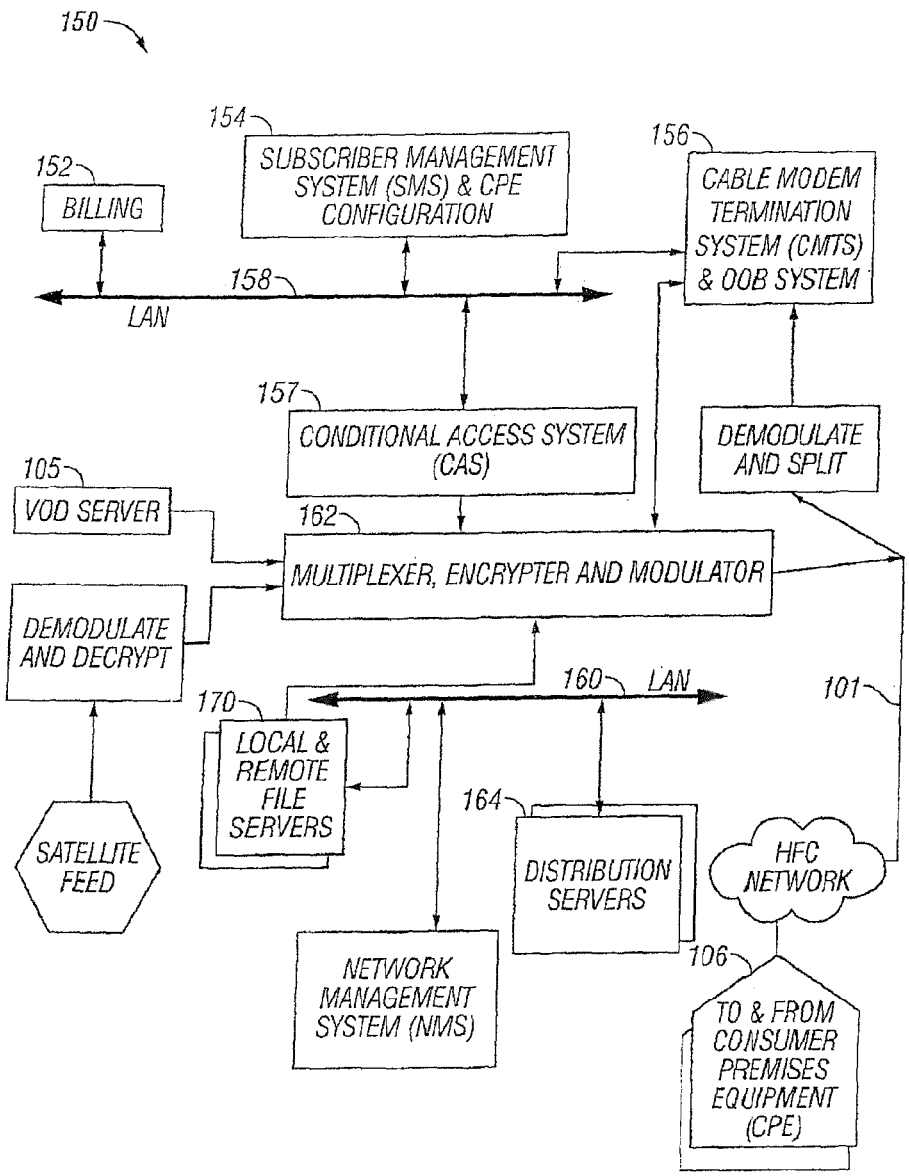
FIG. 1a is a functional block diagram illustrating one exemplary head-end configuration of an HFC network useful with the present invention.

Referring now to FIG. 1a, one exemplary embodiment of a head-end architecture useful with the present invention is described. As shown in FIG. 1a, the head-end architecture 150 comprises typical head-end components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the head-end configuration depicted in FIG. 1a is high-level, conceptual architecture and that each MSO may have multiple head-ends deployed using custom architectures.

The architecture 150 of FIG. 1a further includes a multiplexer/encrypter/modulator (MEM) 162 coupled to the HFC network 101 adapted to "condition" content for transmission over the network. In the present context, the distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3 z Gigabit Ethernet device). As previously described, information is carried across multiple channels. Thus, the head-end must be adapted to acquire the information for the carried channels from various sources. Typically, the channels being delivered from the head-end 150 to the CPE 106 ("downstream") are multiplexed together in the head-end and sent to neighborhood hubs (not shown).

Content (e.g., audio, video, etc.) is provided in each downstream (in-band) channel associated with the relevant service group. To communicate with the head-end, the CPE 106 uses the OOB or DOCSIS channels and associated protocols. The OCAP 1.0 specification provides for networking protocols both downstream and upstream, although other protocols and specifications may be used.

The transmission channels from the head end to the CPE may be 6 MHz bands populating a forward passband, e.g., 350-750 MHz band, of a coaxial cable, which is allocated for downstream communication from headend 105 to a set-top terminal. The use of other channel bandwidths and frequencies is also consistent with the present invention.

It should be noted at this point that the term "transmission channel" is to be distinguished with a "program channel." A "transmission channel" signifies a designated frequency band through which a transport stream containing broadcast programs is transmitted. On the other hand, a "program channel" signifies the source of the program material selected by a user to view. For example, a user may select program channel 2 to view program material provided by CBS, program channel 14 to view program material provided by ESPN; program channel 32 to view program material provided by MTV, and so forth.

Upstream data from a set-top or other device to the headend 105 may be communicated via a reverse passband, e.g., 5-40 MHz band, of a coaxial cable. The reverse passband comprises reverse data channels (RDCs) having a 1 MHz bandwidth in this instance, through which quaternary phase shift keying (QPSK) signals containing upstream data are transmitted. It should be noted that the 1 MHz bandwidth allocated for an RDC here is for illustrative purposes only.

It will also be recognized that the multiple servers (OD or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups. One exemplary multi-server architecture particularly useful with the present invention is described in co-pending and co-owned United States Patent Application Publication No. 20020059619 to Lebar published May 16, 2002 and entitled "Hybrid central/distributed VOD system with tiered content structure" which is incorporated herein by reference in its entirety.

In the exemplary embodiment of the content delivery network of the invention, a hybrid central/distributed and tiered video-on-demand (VOD) service network with tiered content structure is disclosed. In particular, the exemplary system uses media servers located in both the head-end and hub stations. Set-top boxes generally would be supplied VOD services from the high-demand content media (and optionally data, as discussed below) servers located in the hub station nearest to the user. The central media server located in the head-end would be used as an installed backup to the hub media servers; as the primary source for lower demand VOD services and as the source of the real time, centrally encoded programs with PVR (personal video recorder) capabilities. By distributing the servers to the hub stations, the size of the fiber transport network associated with delivering VOD services from the central head-end media server is reduced. Hence, each user has access to several server ports located on at least two servers. Multiple paths and channels are available for content and data distribution to each user, assuring high system reliability and enhanced asset availability. Substantial cost benefits are derived from the reduced need for a large content distribution network and the reduced storage capacity requirements for hub servers.

High speed data download capability can also be provided via the aforementioned VOD infrastructure; a description of an exemplary high-speed data system and methods for use over a video-on-demand system can be found in co-pending and co-owned U.S. patent application Ser. No. 11/013,66 filed Dec. 15, 2004 and entitled "Method and Apparatus for High Bandwidth Data Transmission in a Content Based Networks", which is incorporated herein by reference in its entirety.

The CMTS 156 generates network data that is transmitted by way of MEM 162 on the out of band channels. Typically the network data comprises internet protocol (IP) packets that provide, inter alia, user access to internetworking (e.g., the Internet).

The VOD server 105 (or its proxy) contains a programming library and associated database. The database includes, among other things, a list of the programming and the types of encoding and conditional access technologies that are to be used with each program.

Methods

Figure 2:
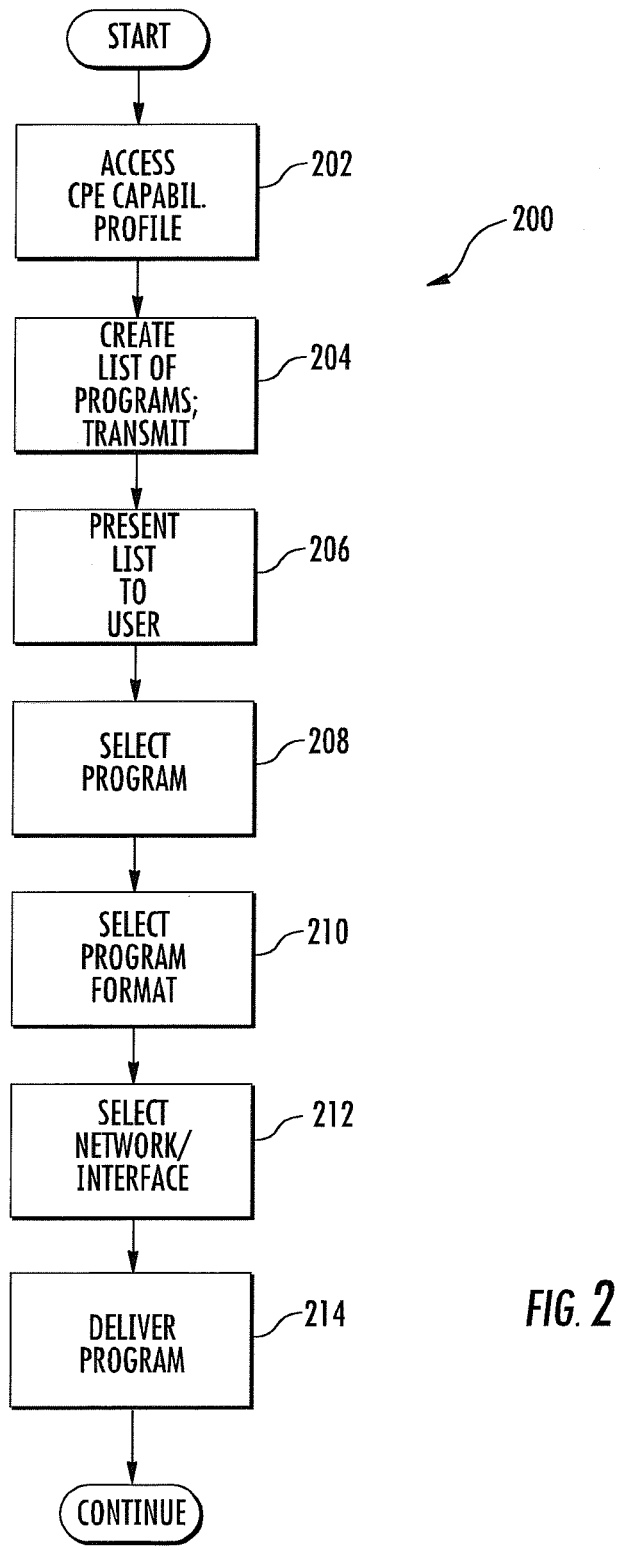
FIG. 2 is a flow chart illustrating a method of operation performed in accordance with one embodiment of the invention.

FIG. 2 is a flow chart illustrating an exemplary method of operation performed in accordance with one embodiment of the invention.

The exemplary process 200 begins at step 202, wherein a description or. list of capabilities ("profile") relating to one or more CPE 106 is accessed. This list may be generated and transmitted using a session setup protocol (SSP) message generated by the CPE 106; this protocol is described in greater detail subsequently herein, although it will be recognized that any number of different protocols can be used consistent with the invention, such as for example the Session Initiation Protocol (SIP), those specified in Part 6 of "MPEG-2: Digital Storage Media-Command And Control" (referred to as DSM-CC) defined under the ISO/IEC 13818-6 International Standard, IGMPv.3, a Trivial File Transfer Protocol (TFTP), Real Time Protocol (RTP/RTCP), the Real Time Streaming Protocol (RTSP)), or the Lightweight Stream Control Protocol (LSCP). Alternatively, the description or list may be retained in another location (e.g., proxy, network agent, head-end database, or third party server), and provided from this location via a messaging interface and protocol, or other such mechanism (e.g., direct database access by a VOD server process).

The capabilities described or listed can include, e.g., the conditional access capabilities of the CPE, the video compression/decoding capabilities, processing and memory capability ("thickness" of the CPE's hardware/middleware architecture), hardware or API registry information, etc. Additionally, the network connections and network interfaces accessible to the CPE can be reported if desired.

The foregoing information can also be provided on a "specific request" basis, such as where a request is transmitted to the CPE 106 (or generated internally) to determine if a specific capability, API, etc. (and only that capability, API, etc.)

is present in and accessible to the CPE 106. This approach obviates having to generate highly detailed and potentially lengthy capabilities profile on a routine or frequent basis (e.g., every time the CPE 106 is polled), especially when the required capability, etc. is already identified and readily ascertained.

Where used, upstream transmission of the CPE capabilities profile(s) can be conducted on any number of different bases, including without limitation: (i) at a prescribed periodicity; (ii) upon occurrence of an event (e.g., at CPE or VOD server start-up, or a change in capabilities of the CPE, such as application upgrade installation); (iii) upon particular request from an upstream entity; (iv) based on upstream (e.g., OOB) bandwidth availability, etc.

Upon gaining access to the capabilities profile of the CPE, the processing entity (e.g., SRM associated with the VOD server 105) will compare that profile to a list, table, or similar structure containing information on available content elements (e.g., programs), including the conditional access mechanisms available for those programs. Similarly, other parameters associated with that program can be evaluated, such as e.g., appropriate video codecs, etc. The processing entity will then create a list of programs that are available for viewing by the CPE 106 for which the profile was derived, and at step 204 the processing entity will transmit the list of programming to the CPE 106.

At step 206, the CPE will present the list of programs available for use (e.g., VOD selection) by a subscriber. This presentation is typically accomplished via a visual display, such as via the user's monitor or television, although another presentation system (e.g., GUI or menu structure on a PC, audible cues, etc., may also be used. One exemplary apparatus and method for transmitting and displaying program listing information is described in co-pending and co-owned U.S. patent application Ser. No. 10/390,963 (Client Docket No. 61575.1014) filed Mar. 18, 2003 and entitled "Technique For Providing Program Guide Data Through A Communications Network Delivering Programming Content", which is incorporated in its entirety herein by reference, although it will be appreciated by those of ordinary skill that other techniques may be used alone or in combination with the foregoing.

At step 208, the user selects a particular program for viewing, such as via an existing VOD client application (e.g., on-screen navigator or similar application) resident on the CPE 106. This selection is forwarded to VOD server 105, such as via upstream message or signaling interfaces of the type well known in the art, and the server 105 causes delivery of the program to the user via, e.g., session and stream instantiation. In one embodiment, the program comprises the only variant of the program available for delivery; i.e., server has a single variant, and determines via the foregoing method whether or not a given CPE 106 is capable of utilizing the program (e.g., has the necessary CA capability, codec, etc.). CPE not having adequate facility for access or decoding of the program are not given the option to select it.

In an alternate variant, the server 106 or other content source has a plurality of different variants of a given program available for delivery, and the processing entity evaluates the capabilities of the relevant CPE 106 against those of the different variants of a given program or other content element, and then generates one or more matches where possible. These matching program variants can each be delivered to the CPE 106 being profiled, depending on other factors which may exist such as availability or demand for one variant over another, downstream bandwidth requirements, differences in the actual content of the program (e.g., one variant adapted for West Coast viewers, versus other geographic regions of the country), and so forth.

In another variant, the SRM or other processing entity identifies those attributes or features of the required capabilities profile for a given program (variant) that are not present in the capabilities profile of the CPE 106 being evaluated, and causes a message or signal to be generated. This message or signal may simply comprise an error message or log file, or may also comprise a request for service to the CPE, such as for downloading an application, codec, CA component, encryption data or key, API, or other component needed by the CPE 106 to make use of the content. This process can be controlled by a permission/access scheme of its own, such as where the provision of these "missing" components is controlled by the user's prior authorization, payment, subscription level, or other parameter(s). These components can be downloaded, e.g., via in-band or OOB downstream channel, or even via a separate channel such as via DOCSIS channel and cable modem. They can be selected, for example, from a codec/CA key/API "carousel" or other similar mechanism. This process can be made substantially transparent as well, such that it occurs immediately preceding VOD session instantiation, or concurrent with or preceding other events (such as CPE startup).

In the illustrated embodiment of FIG. 2, the processing entity (e.g., VOD SRM) selects the format in which to deliver programming based on the capabilities of the CPE 105 at step 210.

Additionally, in another embodiment of the invention, the VOD server 105 will determine the network over which to deliver the programming to the CPE (step 212). This decision could depend upon several factors such as the bandwidth available on each of the possible delivery networks, the possibility of multicasting and re-using an ongoing transmission in a network, and so forth. For example, in one embodiment, loading or available bandwidth is generated by the network and sent to the VOD server/SRM periodically, such as via an inter-process message. Alternatively, the number of dropped packets on each network could be monitored and used as a determinant. Network load can also be evaluated by looking at the delay incurred when data is transmitted over the network.

As is well known, multicasting is an effective method of reducing bandwidth requirements for IP or similar packet-based transmissions. For example, where two IPTV-capable client devices are in operation on the network, and have consistent or identical capability profiles, a given program requested by both devices can be multicast to these devices (as opposed to two unicasts), the former requiring less downstream bandwidth than the latter.

Myriad different algorithms for determining the best or optimal network channel(s) to transmit content over under varying operational conditions will be readily recognized by those of ordinary skill provided the present disclosure.

In some instances, the network selected for delivery will be the normal in-band RF downstream link to the CPE 106. In other instances, the VOD server 105 might select a lower bandwidth VC-1 or H.264-over-DOCSIS channel, or OOB channel. In still other instances, the program could be provided via a standard internetworking connection (e.g., via the Internet as delivered via another channel outside of the cable network such as a satellite, WiMAX or WiFi interface, assuming suitable bandwidth).

The VOD server 105 can also use a list of network connections or interfaces provided by the CPE 106 to determine what methods for delivery are available in the first place. Alternatively, this information can be drawn from a database or other such repository maintained at the head-end or another location within the network, which is based on initial registration information as well as periodic updates provided by the CPE or another entity tasked with gathering such information.

Upon selection of the network to use for delivery, a message it transmitted to the CPE informing it of the selected delivery interface/channel(s). The programming is then delivered at step 214 via the selected interface.

In should be noted that in some embodiments of the invention, other programming or data may be received and processed by the CPE simultaneously with performance of the method 200 described in FIG. 2. For example, the CPE 106 may receive a first program for viewing in real-time, a second program for storage and later viewing, as well as high speed data downloads via the aforementioned VOD-based download capability described elsewhere herein, all while receiving the video-on-demand programming as described above.

In an alternative embodiment of the invention, the CPE 106 is configured to maintain the capabilities profile internally, and act as the "processing entity". In this embodiment, the application server or other upstream entity will transmit a listing of programs and variants thereof available for viewing (this list may be a complete listing, or a subset thereof), along with the conditional access and video compression options available for those programs (variants). The CPE 106 receives this list of programs, and compares it with its own capabilities profile in order to provide a CPE-specific list of programs available for viewing by the subscriber. This list of CPE specific programs will be displayed to the user. The CPE-specific capabilities profile can also be extended to connected devices; e.g., other devices which are part of a local network, or otherwise in communication with the "host" CPE (e.g., DSTB). For example, a wireless interface between the CPE (DSTB) and a personal electronic device (such as a PDA) can be used as the basis for transmitting capabilities profile information about the PDA to the CPE, the latter which then utilizes this information to form a super-set of capabilities for itself and any connected devices. This is also true for the prior embodiments described, wherein the processing entity is upstream of the CPE, such as at the VOD server/SRM.

In the aforementioned "superset" approach, a mechanism for restricting access to particular programs or variants thereof can also be employed in order to avoid situations where a non-capable platform attempts to select and access the content. For example, if only the wireless PDA previously described has a particular conditional access capability, whereas its "host" DSTB does not, then the client application running on the CPE 106 is configured to remove this program variant from the listing displayed to the subscriber, or alternatively mark this entry as "PDA only" or the like.

Under the foregoing embodiment wherein the CPE 106 acts as the processing entity, the processing required by VOD server 105 is reduced, as it is not required to compare the programming lists with the capabilities profile providing by the CPE. Rather, the comparison function is distributed across the individual CPE. However, the amount of data that is transmitted downstream to the CPE in this approach could be greater, as the complete lists of available programming and associated formats will be larger than the customized lists generated under the previously discussed "centralized" approach, although upstream communication of the CPE profiles is also required.

In an exemplary "distributed" processing approach, the CPE 106 will discover is own capabilities by polling or by reading a set of capabilities from a registry or other such information storage or registration mechanism. The VOD server or its proxy will transmit a list of programs and the associated formats available for those programs to the CPE. Transmission and delivery of this listing may also follow any number of different paradigms such as those previously described with respect to upstream transmission (e.g., periodically, upon occurrence of a particular event, upon request, etc.). The CPE 106 will then determine the set of programs available that are compatible with its capabilities (or those of communicating client devices, as previously described), and then will display the authorized or accessible programs (which may also be on a per-device basis, such as for connected client devices).

In another aspect of the invention, the CPE and/or associated client device profile information can be stored at the server or other network repository (e.g., database), such that real-time polling of the CPE is substantially obviated. In one variant, the CPE 106 is configured to poll itself (i.e., hardware/software modules) or access its internal registry only upon certain events, such as at initial installation and boot-up. This initial profile is then sent to the head-end, server, or other repository for storage, so that the configuration profile for that CPE can be subsequently accessed based on, e.g., a user/device ID (such as the "TUNER_ID" variable or MAC address) or other such indexing mechanism. Thereafter, a configuration change record is optionally maintained within the CPE 106, and when a change to the CPE's hardware or software configuration or registry occurs, only the change information is sent up to the server/repository. This approach obviates polling and sending an entire capabilities profile description each time the information is required by the server/SRM. It also obviates any downstream profile requests, since the onus is placed on the CPE to update its own profile and records (either directly or via a proxy). Furthermore, the server/SRM or other processing entity using the CPE profile data need not have communication with the CPE in order to obtain the information; hence, during periods of maintenance, failure, high downstream loading, etc., the processing entity can perform the profile and program analysis tasks independently of any contact with the CPE 106.

In another aspect of the invention, the processing entity (e.g., VOD server process/SRM) can be configured to analyze the profile data for two or more CPE 106 in order to identify commonalities or other features of interest. This comparison or identification of features can be used for other useful purposes, such as identifying instances where multi-casting of content or data may be possible. In certain instances, multi-casting can advantageously be used to save network bandwidth. This scheme becomes even more useful when conditional access or other (e.g., network interface or codec/encryption) capability reported by a video receiver matches the conditional access capability of another device, that is also receiving (or desires to receive) the same program. Even when different conditional access systems are used by these two devices, the encrypted multimedia stream can be shared; only the key data stream needs to be different.

However, since program selections by a user are not made until after the list of accessible or available programs or content is generated and transmitted to each user, the instigation of actual multicast operation is not performed until two or more CPE (or associated client devices) with matching CA or other capabilities select the same program or content for viewing. At this point, the VOD server/SRM or other processing entity can cause those actions necessary within the network in order to take advantage of the aforementioned commonalities.

The aforementioned commonalities could also be utilized in conjunction with the methods and apparatus set forth is co-owned and co-pending U.S. patent application Ser. No.

11/048,348 entitled "Method and Apparatus for Network Bandwidth Conservation" filed Feb. 1, 2005, also incorporated by reference herein in its entirety. Specifically, the aforementioned disclosure describes, inter alia, methods and apparatus for conserving bandwidth by taking advantage of the fact that most programming (for most of the typical broadcast day and available channels) will be in an SD or other lower-bandwidth format. For example, a given movie may be broadcast on user or program Channel X in its analog or digital SD form, with an SD simulcast on program Channel Y during parts of the day, and an HD simulcast on program Channel Y during other parts of the day (e.g., "prime time"). However, until the prime time or other designated HD broadcast slot is reached, the HD simulcast on Channel Y will simply comprise the same SD content available on Channel X. Thus by mapping the user's Channel Y to the QAM channel for Channel X, the network operator conserves "multicast" bandwidth associated with the SD content for a significant fraction (often the majority) of the programming day. Similarly, the aforementioned information relating to CPE capabilities commonality can be used to create intelligent program channel to QAM mappings such that the CPE can be controlled on a per-device basis based on their indigenous capability profile. As a simple example, if two SD "simulcasts" have a heterogeneous parameter (codec, conditional access type, etc.), and two CPE want to view the program content of the simulcast, the processing entity responsible for program mapping allocations can evaluate the capabilities profile of the two CPE and decide which is better mapped to which QAM (and hence which variant of the heterogeneous "simulcast" is selected).

Various other types of functionalities may also be included within the CPE or associated client device relating to the downloaded content. For example, in one embodiment, digital copyright data is included within the downloaded data/content, such as well-known digital watermarking data of the type authorized under the United States Digital Millenium Copyright Act (DMCA). For example, Digimarc®, SysCoP™, EIKONAmark™, and other similar commercially available watermarking approaches can be used. Media rights management systems such as the Microsoft Windows® Media Digital Rights Manager (DRM), may be used as well. Various types of steganographic approaches may also be employed consistent with the invention in order to enforce copyright and provide the copyright owner with accountability and/or trace-ability of the downloaded and copyrighted material. These features can also act as the basis for a capabilities analysis, such as where if a given CPE or client device has no DRM capability, it will not be authorized to receive rights-protected content, or alternatively will only be authorized to receive content that has certain types of additional rights protection data associated therewith (e.g., watermarking, steganographic data, etc.).

Figure 2A:
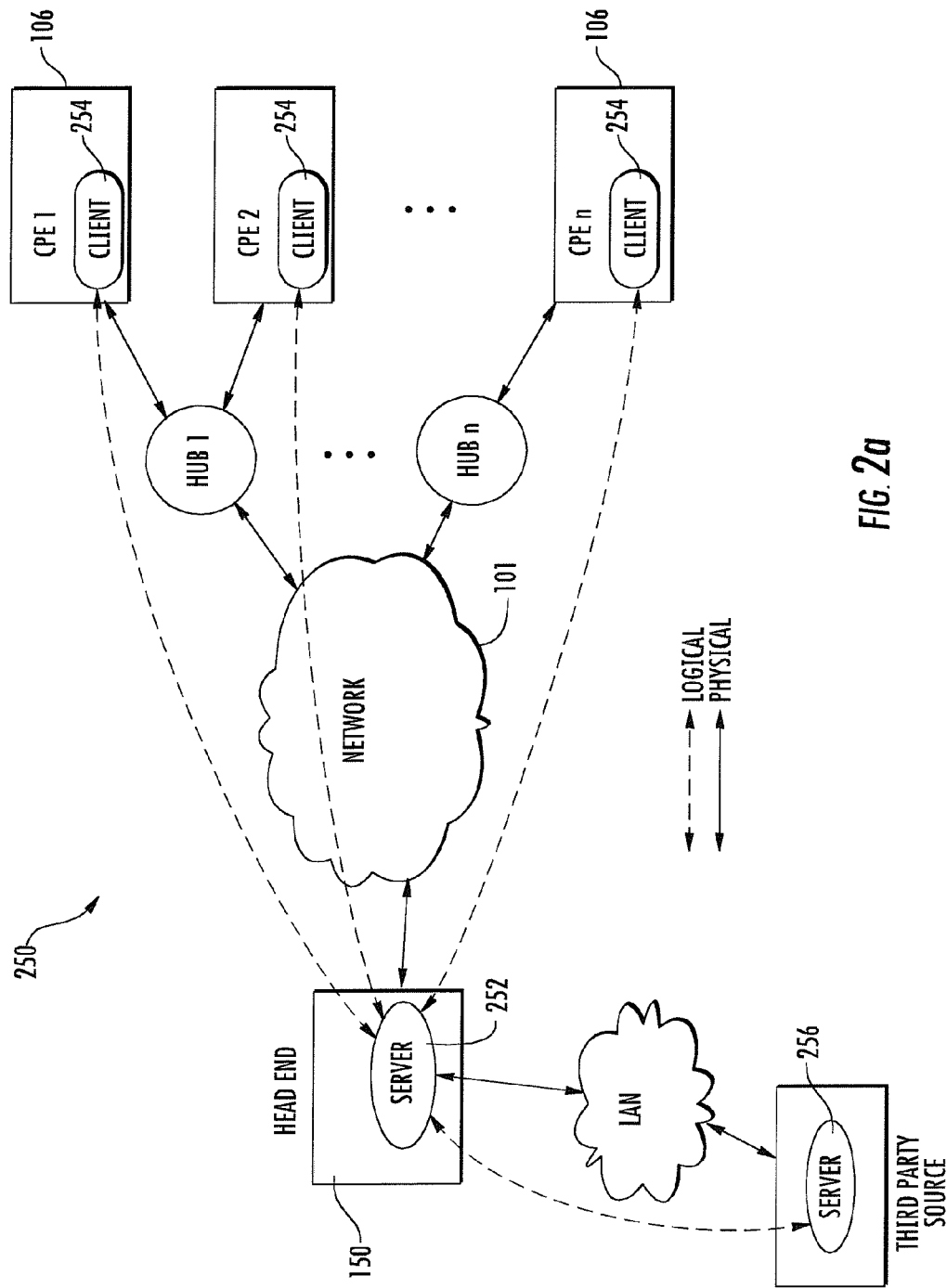
FIG. 2a is a graphical representation of one embodiment of a software architecture adapted for CPE capability profiling and program selection according to the present invention.

FIG. 2a is a graphical representation of one embodiment of a software architecture adapted for CPE capability profiling and program selection according to the present invention. As shown in FIG. 2a, the architecture 250 comprises a server or network process 252, and one or more client processes 254 in communication therewith. In one variant, the network and client processes comprise parts of an object-oriented distributed application (DA) of the type known in the programming arts, although this is not a requirement. Inter-process communication occurs over the network 101 (or other available communication channels) between the network and client processes 252, 254 in order to effect the various functions described elsewhere herein (i.e., CPE profiling, profile evaluation, program evaluation, and available program list delivery). These processes can be integrated with other software (e.g., applications or even middleware) in the CPE 106 and the server (e.g., VOD server 105), or alternatively comprise their own stand-alone application.

As described previously, the various functions including CPE profile analysis, profile evaluation versus available programming, etc. can also be distributed across these processes 252, 254, as well as others (such as another process 256 disposed on a third party server). Hence, the illustrated software architecture provides significant flexibility in terms of deployment, especially over existing infrastructure, since little modification to such infrastructure is required in order to support these functions.

In another embodiment of the invention, the relevant head-end process (e.g., SRM, proxy, application server, etc.) delivers a generic list of programming and associated requirements to the CPE 106, such as via a periodic delivery mechanism, or alternatively upon a request issued by the CPE 106. When the CPE 106 requests a given program, the SRM (or other process) determines the program configuration to deliver to the hub (and hence ultimately the requesting CPE) based on one or more network operational parameters, such as e.g., current utilization of QAM resources for that hub. For example, where the SRM detects a high current QAM loading, it may select a program variant that has a lower-bandwidth codec associated therewith, and/or select a network interface for delivery of the content that optimizes network resources. This selection process is ideally (but not necessarily) mapped to the requesting CPE's profile data; i.e., the SRM selects a program variant encoded using a codec corresponding to a codec already installed on the CPE 106. Alternatively, the SRM can select a program variant encoded using a non-indigenous codec, and cause a download or installation of this codec in real-time in order to satisfy the CPE request. Similar logic applies to selected network interfaces and CA.

It will also be appreciated that so-called "business rules" of the type described subsequently herein may act as a basis for such selections and operational modifications. For example, a subscriber's subscription level or the like can be used as a determinant of the type of codec used, network interface selected, etc. A premium service subscriber, for example, might receive programming using the highest bandwidth codec (and hence ostensibly the highest picture and audio quality) on a routine basis, and only after such premium subscribers have been serviced, will the codec, interface, etc. selections be made for other subscribers.

The aforementioned operational and business rules can also be combined, such as wherein the "premium subscriber" logic described above is combined with QAM loading data for a given hub, and hence business rules are only enforced to the extent that they do not violate or conflict with certain operational floors, ceilings, or other parameters. The converse may also be enforced; i.e., where the operational rules are enforced but only to the degree that they do not violate or conflict with business limitations or rules. Myriad combinations of the foregoing are also possible consistent with the present invention.

The present invention also contemplates "on demand" configuration of the various content elements or programs prior to or during delivery to the CPE 106. For example, one alternate embodiment of the invention allows the SRM or other process/agent within the head-end or other upstream entity of the network to receive the profile data associated with a given CPE (or set of CPEs), and configure a generic version of the content for delivery thereto. Such configuration may comprise, e.g., encoding the content before delivery (or even during streaming) with the appropriate codec for the one or more profiled CPE. This approach substantially obviates many of the different variations within the content library, since one substantially generic variant is used as a basis for producing all (or at least portions) of the requested coding formats. Transcoding (e.g., conversion from one encoded format to another) at the head-end or other such entity may also be employed.

The present invention further contemplates the case where subscriber or user-supplied or selected capabilities are used as part of the evaluation process. For example, one variant of the invention described herein includes the capability for the client application running on the CPE 106 (or other software) to present the user with a plurality of choices as to the configuration of their CPE.

In one variant, the user is shown a listing of options (or programs utilizing different options) from which they may pick, even if the capabilities associated with these options are not currently indigenous to their CPE 106. For example, a user might be presented with a screen display that shows the same program encoded according to three different codec formats. Upon selection of one of these options indigenous to the CPE 106, the content is delivered to the CPE. Upon selection of a non-indigenous option, the server 105 or other network agent then downloads the necessary component (e.g., codec) to the CPE via, e.g., an in-band or OOB channel, and installs the codec thereon.

In another variant, the user can specify a source of a new component (e.g., codec), such as a website URL, wherein the server 105 or agent can fetch the codec if not already in possession thereof. The server/agent then can encode a generic variant (previously described) using the selected codec, thereby making a somewhat customized version for that subscriber. This allows the user to create a coded version of the program for, inter alia, subsequent or contemporaneous recording such as by way of the apparatus and methods described in co-pending and co-owned U.S. patent application Ser. No. 11/080,693 filed Mar. 14, 2005 and entitled "METHOD AND APPARATUS FOR NETWORK CONTENT DOWNLOAD AND RECORDING", which is incorporated herein by reference in its entirety. This may be useful for example in cases where the user desires to obtain a copy of the content in a specific encoded format that may not be supported by the network library previously described. The server/agent hence acts as an encoding facility for encoding content in formats designated by the user. This feature can also form the basis for a business model, such as where only "premium" users are offered this ability, or it is provided on a pay-per-use or similar basis.

Exemplary CPE

Figure 3:
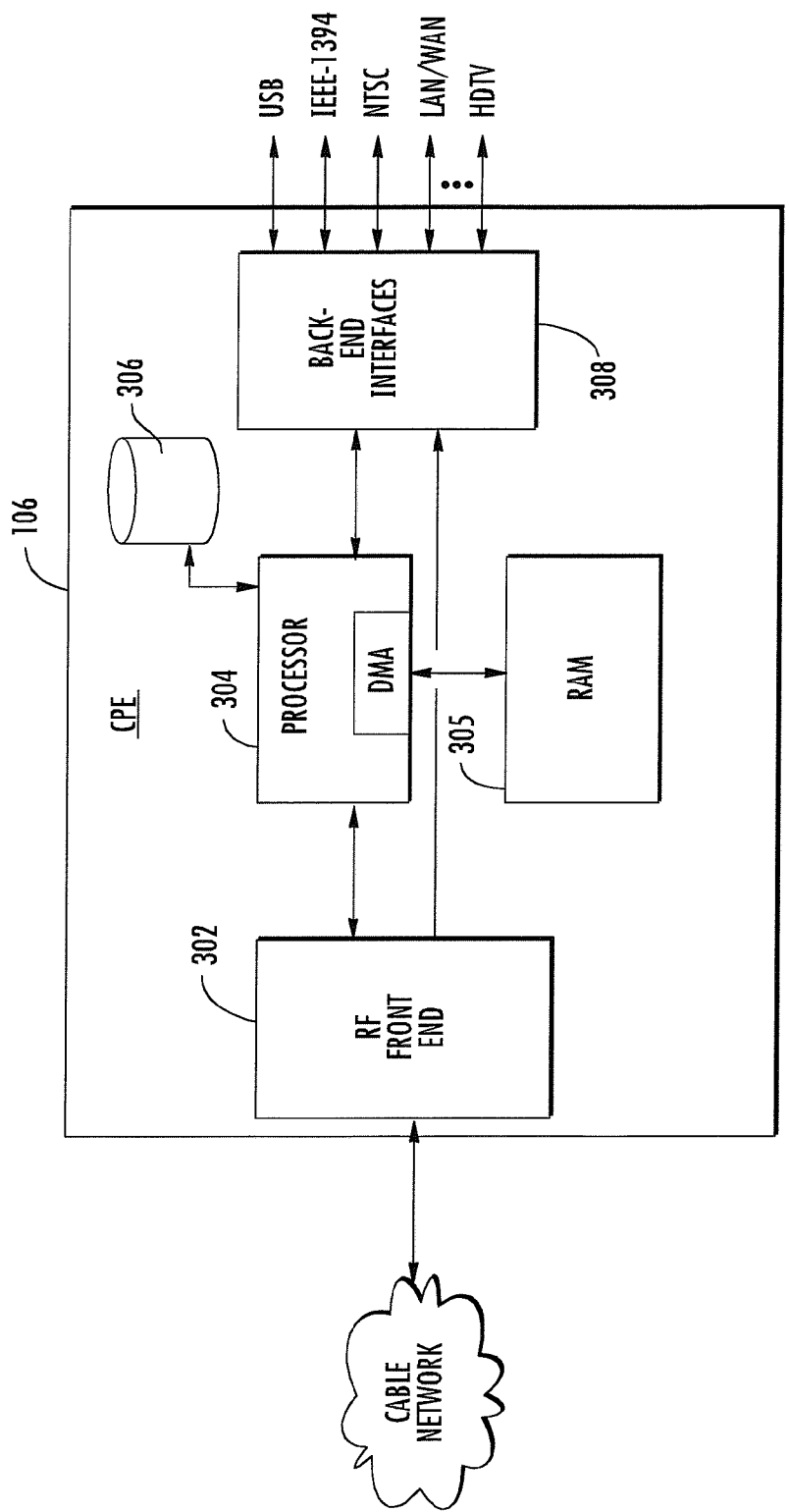
FIG. 3 is a functional block diagram of exemplary CPE configured in accordance with one embodiment of the invention.

FIG. 3 illustrates a first embodiment of the improved CPE 106 according to the present invention. As shown in the simplified diagram of FIG. 3, the device 106 generally comprises and OpenCable-compliant embedded system (e.g., DSTB) having an RF front end 302 (including tuner and demodulator/decryptors) for interface with the HFC network 101 of FIGS. 1-1a, digital processor(s) 304, RAM 305, storage device 306, and a plurality of interfaces 308 (e.g., video/audio interfaces, IEEE-1394 "Firewire", USB, serial/parallel ports, WiFi wireless interfaces, etc.) for interface with other end-user apparatus such as televisions, personal electronics, client devices, computers, WiFi or other network hubs/routers, etc. Other components which may be utilized within the device (deleted from FIG. 3 for simplicity) various processing layers (e.g., DOCSIS MAC or DAVIC OOB channel, MPEG, etc.) as well as media processors and other specialized SoC or ASIC devices. The CPE 106 may also comprise an integrated HD decoder, thereby relieving any connected monitors or other devices from the requirement of having such a decoder, although many monitor platforms now carry such HD decoders internally. These additional components and functionality are well known to those of ordinary skill in the cable and embedded system fields, and accordingly not described further herein.

The CPE 106 of FIG. 3 is also provided with an OCAP 1.0-compliant application and Java-based middleware which, inter alia, manages the operation of the device and applications running thereon. It will be recognized by those of ordinary skill that myriad different device and software architectures may be used consistent with the tuning and channel request functions of the present invention, the device of FIG. 3 being merely exemplary. For example, different middlewares (e.g., MHP, ARIB, or ACAP) may be used in place of the OCAP middleware of the illustrated embodiment.

The exemplary CPE 106 further comprises a conventional "Watch TV" application, electronic program guide (EPG) or the like, which services those program or user channels available over the network. The Watch TV application, residing in memory, provides such functions as channel navigation control, channel selection in response to a channel change event, etc. In another embodiment, the Watch TV application further comprises all necessary functionality need to support both the channel request and CPE capability profiling features previously described herein.

In the exemplary embodiment, conditional access functions of the CPE 106 include the ability to receive and process conditional access information, such as encryption key streams. The conditional access information is typically associated with the primary content (e.g., video programming), and may be transmitted within the same data structure (e.g., file) or data stream.

Processing of the conditional access information can also include determining the license rights (e.g., digital rights management, or DRM) allocated therein as they relate to the programming information. The license rights may specify for example, with regard to the associated programming, the duration of use, total number of uses, total number of simultaneous uses, list of system(s) on which use may occur, or other similar types of information. Use typically comprises viewing or listening to the programming, but any type of use including copying or recording, or even transmitting to another platform or environment, is consistent with the present invention.

Once the licensing rights have been determined, the relevant functional module (e.g., CA module within the CPE) can then report the licensing rights available to the video display system. This report can, for example, take the form of a complete summary of the licenses available, or just a positive or negative indication if the program can be viewed at this time. In some embodiments of the invention, the conditional access module may also perform some processing on the programming information including any type of pre-processing, descrambling or decryption necessary for view or further processing by other systems (such as connected PMDs).

Figure 3A:
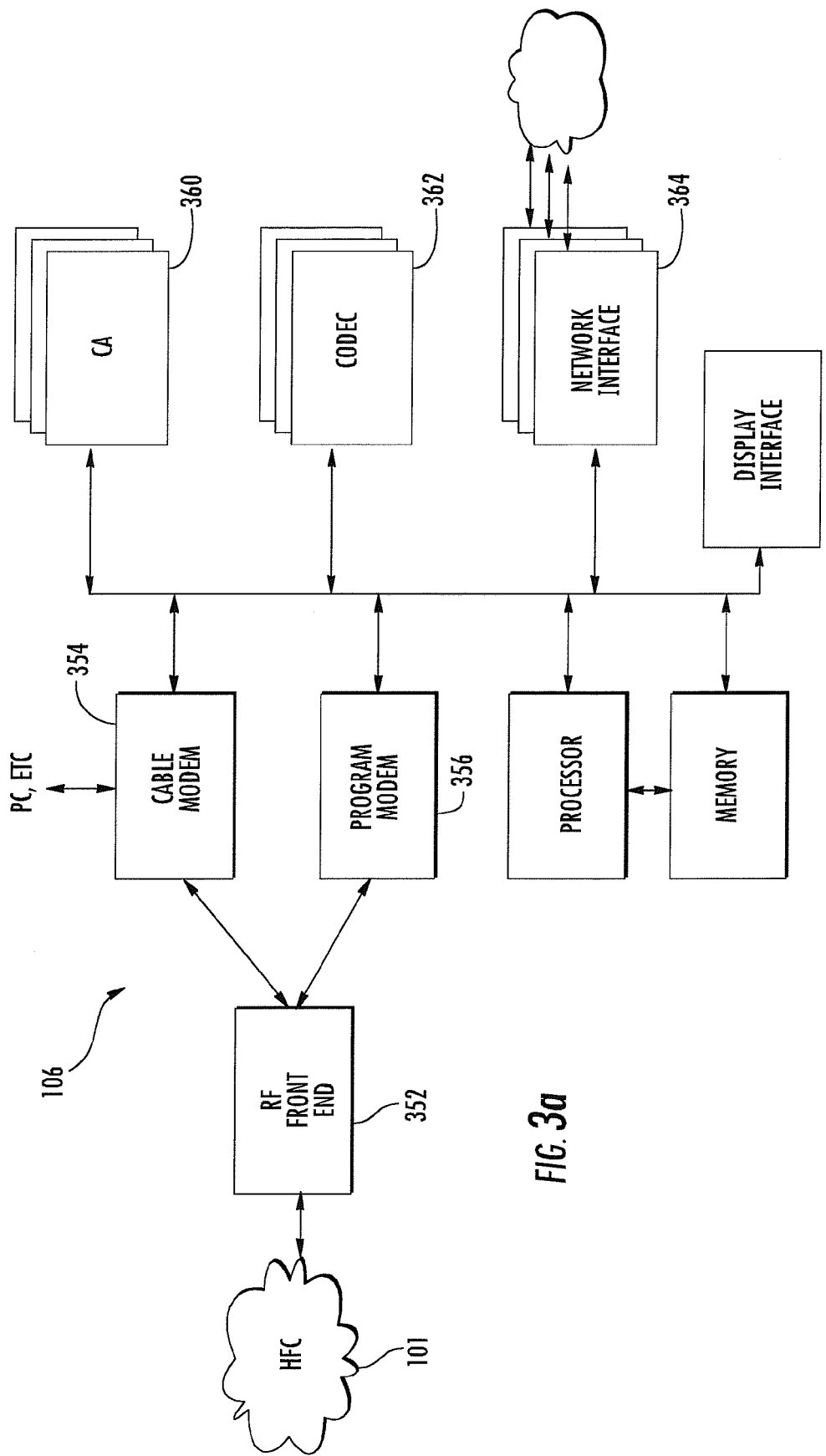
FIG. 3a is functional block diagram of exemplary CPE configured in accordance with a second embodiment of the invention, wherein a cable modem (CM) is also integrated.

FIG. 3a is a functional block diagram of a "integrated" CPE 106 configured in accordance with another embodiment of the invention. Within this embodiment of the CPE 106 is an RF front end 352 coupled to cable modem 354 and programming demodulator 356. Hence, both "in band" QAMS carrying program content, and DOCSIS channels carrying e.g., IP-based packets, can be delivered and processed using a unified device. The codecs, CA, and network interface capabilities can also all be optionally "pooled" so that access, decoding and distribution of data received via the cable modem can be accomplished before delivery if desired.

The RF front end 352 including tuning apparatus (e.g., one or more tuners) adapted to tune to prescribed QAMs delivered over the network 101. A wideband tuner arrangement such as that described in co-owned and co-pending U.S. patent application Ser. No. 11/013,671 entitled "Method and Apparatus for Wideband Distribution of Content" filed Dec. 15, 2004 and incorporated herein by reference in its entirety, may also be utilized, such as where the content associated with one or more program streams is distributed across two or more QAMs.

It will be appreciated that while multiple instances of each type of module (e.g., CA, codec, etc.) 360, 362, 364 are shown in FIG. 3a, the use of single instance of a module is consistent with the use of the present invention. In one embodiment of the invention, the various components that make up CPE are semiconductor integrated circuits, the use of which is well known in the art.

During operation the RF front end receives RF signals transmitted from the head end. These RF signals include normal in-band RF downstream used for video programming distribution as well as "out-of-band" RF transmissions normally for cable modem services and high definition television services. The RF front end isolates the various RF channels and provides the appropriate signals to the cable modem 354 and programming modem 356.

The cable modem signals are typically QAM modulated RF signals processed in accordance with the DOCSIS standard. The programming signals are both analog modulated RF signals and digitally modulated RF signals that typically carry video and audio information.

The RF front end also generates RF signals for transmission to the head end via HFC 101 in response to digital signals from the cable modem 354 or programming modem 356. These signals are used to communicate with the various systems that make up the head end (FIG. 1a) as well as any other systems on the network or associated networks. They also provide one upstream communication capability for the cable modem 354.

Figure 3B:
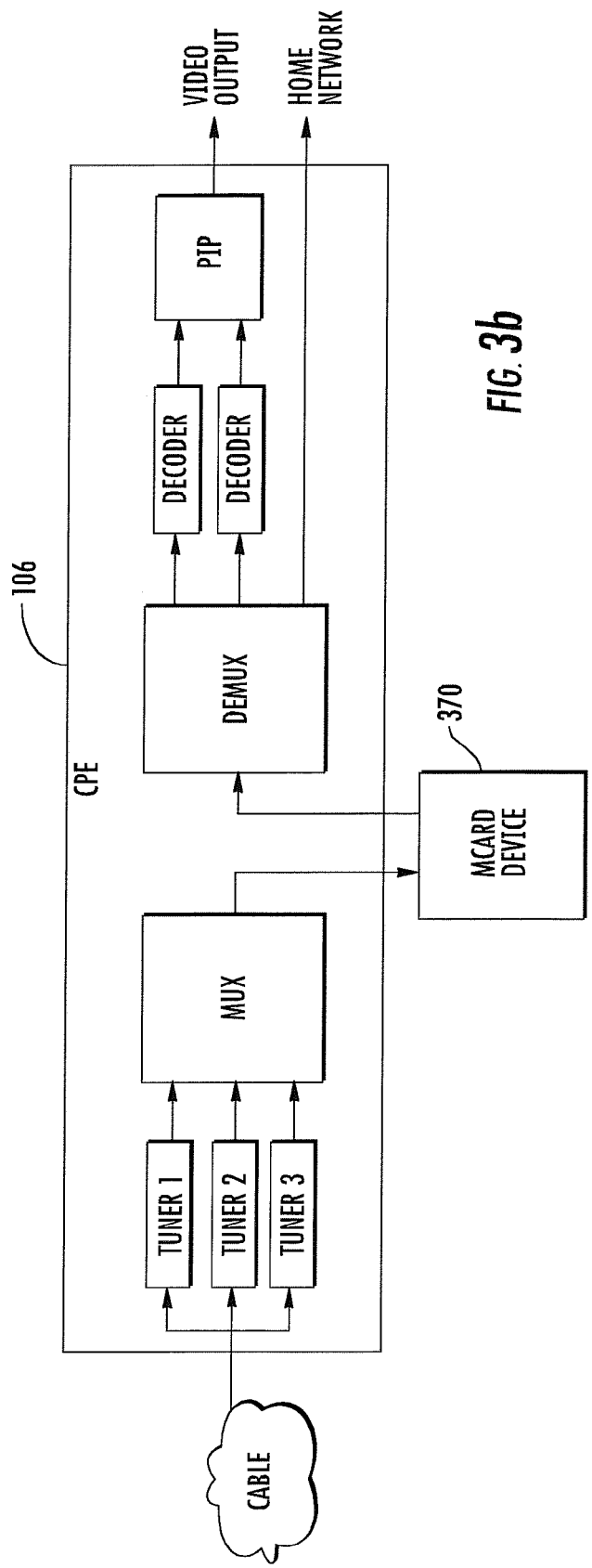
FIG. 3b is functional block diagram of exemplary CPE configured in accordance with a third embodiment of the invention, wherein CableCard™ conditional access functionality is also present within the CPE.

FIG. 3b illustrates another embodiment of the CPE 106 of the invention, wherein the aforementioned conditional access (CA), network interface, and/or codec capability within the CPE is combined with "CableCard" functionality as described in, inter alia, OpenCable™ Specification OC-SP-MC-IF-C01-050331 entitled "Multi-Stream CableCARD Interface", which is incorporated herein by reference in its entirety. In this fashion, the CPE can be configured to operate both in a downloadable CA (e.g., DCAS) environment as well as via the CableCard hardware environment. The CableCard unit 370 can also act as a CA capability within the larger CA profile of the CPE 106, such that it can be polled or accessed and included with any profile or other data sent upstream or otherwise utilized by the CPE as previously described herein. If so configured, the CA functions of the present invention can also download applications or other software for use with the CableCard unit, so as to provide expanded capability for this unit 370. The Cable Card unit may be, e.g., a multi-stream (M-CARD), or otherwise.

In another embodiment of the invention, a personal video encoder (PVE) or comparable device is used as the basis for the CPE 106 or associated client device. For example, the "Slingbox" device manufactured by Sling Media of San Mateo, CA is one such exemplary device which is capable of enabling a user to watch TV programming from various locations via an Internet-connected PC or similar device. The device is generally connected between the subscriber's cable/satellite video drop and DSTB, and has a TV tuner inside. The user tunes to a given channel, and the device encodes the video streamed over the cable/satellite in Windows Media or similar format. The encoded content is streamed to a client application on a Windows XP-based or similar PC via an IP network such as the Internet, and hence the user can view the data locally (i.e., at the same premises) or remotely so long as they have access to the IP distribution network. Hence, the present invention advantageously extends the capability of such PVE devices by providing the capability to profile these devices (or others in data communication therewith) to determine their CA, codec, network interface, etc. capabilities, much as would be performed for a CPE or associated client device. In one embodiment, the PVE is outfitted with the necessary polling/profiling software, and can profile itself and any devices that it is in data communication with (e.g., the subscriber's distant laptop computer or remote PC). In another embodiment, the PVE merely acts as pass-through or router entity, with the profiling functions being disposed entirely on the PC or laptop computer used as the subscriber's "viewing" device at their actual location.

It will be appreciated that the PVE may also be updated itself via the network or other mechanism in terms of capabilities. For example, the PVE can receive new codecs or CA key data from the network so that it can modify its own configuration. These "upgrades" can also be passed through to the subscriber viewing device.

It will also be recognized that the present invention may be used in conjunction with the error logging and reporting methods and apparatus described in co-owned and co-pending U.S. patent application Ser. No. 10/722,206 entitled "Methods and Apparatus for Event Logging in an Information Network" filed Nov. 24, 2003, which is incorporated herein by reference in its entirety. For example, the aforementioned disclosure describes methods and apparatus (including APIs) for logging errors that occur on client devices or CPE 106. In the present context, these errors (which might relate to an error resulting from improper use of a codec, failure to properly authenticate or implement conditional access, failed encryption key(s), etc.) can then be transmitted upstream to a responsible entity (e.g., VOD or conditional access server).

The present invention may also be utilized consistent with the hardware registry apparatus and methods described in co-owned and co-pending U.S. patent application Ser. No. 10/723,959 entitled "Methods and Apparatus for Hardware Registration in a Network Device" filed Nov. 24, 2003, also incorporated herein by reference in its entirety. This disclosure provides apparatus and methods for control of hardware within a networked electronic device (e.g., CPE) through use of a hardware registry. The registry contains records that correspond to an optional set of hardware functionality (e.g., personal video recorder). Each record (or set of records) may contains fields that: (i) identify the type of circuitry and peripherals, (ii) uniquely identifies circuitry and peripherals of the same type, (iii) specify parameters that are specific to the circuitry and peripherals types, and/or (iv) contain a reference to an application programming interface that can be used to access and manipulate the circuitry and peripherals. In the exemplary configuration, the electronic device comprises an OCAP-compliant consumer premises device (e.g., embedded set-top box, etc.) adapted to provide control over Host CORE optional circuitry for a digital video recorder (DVR) and digital video interface (DVI). A DVR/DVI application can therefore be downloaded to retail or leased set-top boxes and other consumer electronics equipment, which provides control of any available DVR/DVI circuitry found therein or functions associated therewith. This not only permits "after-the-fact" control of optional hardware features in a retail (third party) electronics device by the MSO or other system operator, but also allows for control and reconfiguration of leased devices after distribution to the end user(s).

It will further be appreciated that the client application (or other software process, such as a WatchTV application or the middleware/OS) running on the CPE 106 can be configured to select network interface technology for delivery of content (as contrasted with an upstream entity such as the SRM making this determination). For example, where the CPE comprises a plurality of RF tuners, Ethernet interface, and/or cable modem, etc., the client application can: (i) determine these capabilities as previously described (e.g., via access to a registry or polling), and then (ii) apply one or more criteria in selecting the appropriate interface. These criteria may be indigenous; e.g., information derived solely from the CPE 106 itself or connected devices, or alternatively be based wholly or in part on information obtained from an external entity (e.g., SRM, BSA switch, proxy server on the Internet, etc.). As an example of the latter, the SRM might forward a list of available in-band QAM frequencies (channels) or CM QAMs to the CPE, these channels/QAMs being "ranked" or in some way prioritized based on e.g., current QAM contention or loading. In the BSA environment described subsequently herein with respect to FIGS. 7*a* and 7*b*, the information form the BSA switch 726 or other supervisory entity might comprise a QAM or channel list prioritized in order to optimize (minimize) bandwidth consumption.

Alternatively, the client application of the CPE 106 can select the best (most optimal) network interface to use based on its own internal considerations or parameters, which include the availability of certain interface types, their bandwidth capability, current loading, etc.

Various inter-relationships and hierarchies can also be utilized in implementation of the foregoing logic, such as where the network (e.g., SRM) supplied priorities are imposed upon the CPE, and the CPE attempts to utilize these in order of decreasing priority consistent with its own network interface capabilities. For example, the SRM might broadcast a priority list to multiple CPE (e.g., CM RF tuner first, in-band RF tuners second, etc.). For CPE with an associated CM tuner stage, the first priority interface is selected, while those CPE without a CM tuner will select the second propriety interface, and so forth.

Figure 4:
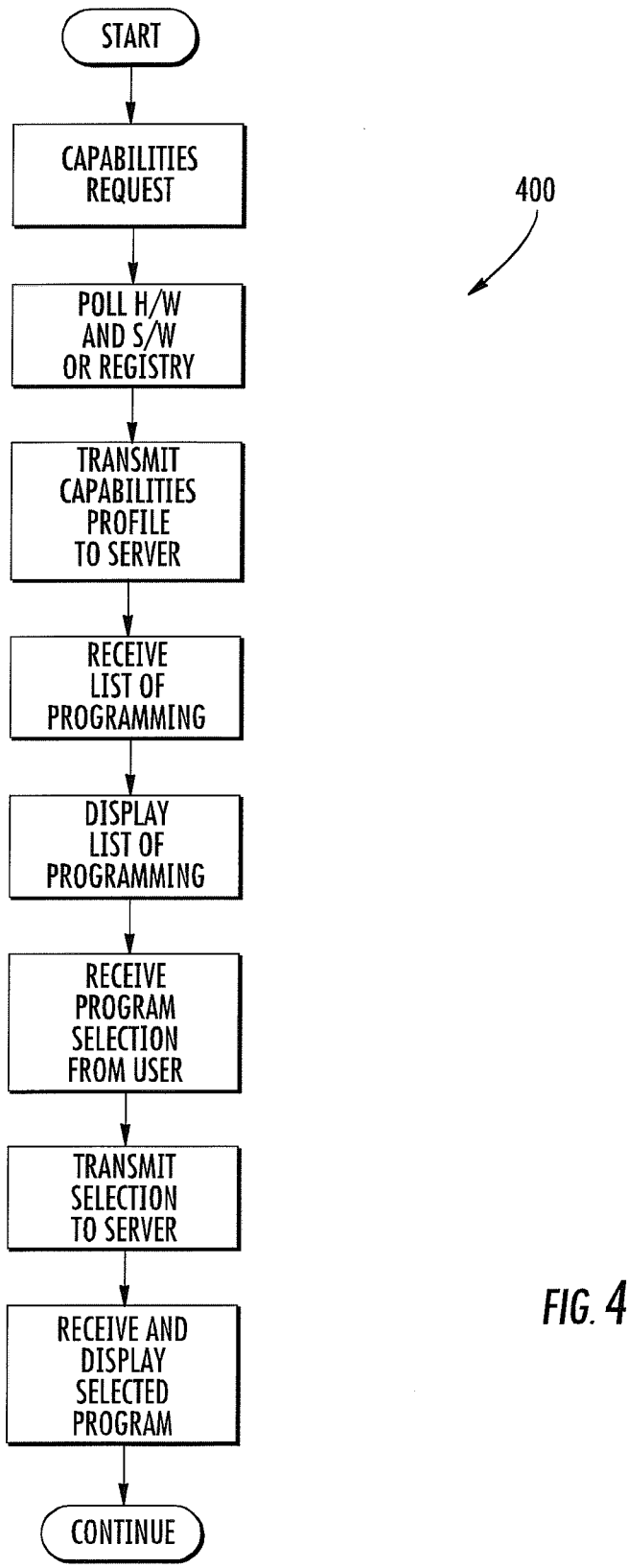
FIG. 4 is a flow chart illustrating the operation of a CPE when configured in accordance with one embodiment of the invention.

FIG. 4 is a flow chart illustrating the operation of the CPE 106 in accordance with one embodiment of the invention. The process 400 begins at step 402, wherein a request for the capabilities of the CPE is generated. This request may be generated in response to external stimulation such as a signaling message from another system on the network (or connected client device), or it may be generated in response to an internal event such as power up, user request, or timer-based triggering.

In response to this request, the CPE polls the functional modules at step 404. The polling can be performed on modules with only a certain type of capability such as conditional access, or video decoding capability or network access. Or, in alternative embodiments of the invention the polling can be performed across multiple capabilities in order to gain a more global profile of the device.

After the results of the polling have been received, the capabilities profile of the CPE is transmitted to the processing entity (e.g., VOD server/SRM) at step 406. The VOD server 105 will normally generate a list of available programming that is compatible with the capabilities of the CPE. This is typically done by comparing the capabilities of the CPE versus those required by the available programming; e.g., comparing the video encoding of the program with the video decoding capability of the CPE. If they match in terms of the minimum critical attributes necessary to deliver and play the programming for the subscriber, the associated program is added to the available content list. Similarly, the conditional access control associated with the program is also compared with the conditional access capabilities of the CPE. If they match, then the associated program is added to the available list. Other parameters or capabilities of the CPE 106 can readily be evaluated in this way also.

At step 408, the CPE receives a list of programming available for viewing is transmitted to the relevant CPE over the network. At step 410, the list of programming available for viewing is processed by the CPE 106 and presented to the user, such as via a connected display device or monitor. In the case of a DSTB, this display device might comprise a television set. For a PC, handheld, or laptop, this might be the computer monitor.

At step 412, a programming selection is received from the user. Such selection can be made via input mechanism including physical switches or buttons on the CPE, or via a remote using wireless technology such as infrared light or radio frequency, the use of which is well known in the art. Selections may also be made using an onscreen menu structure and computer mouse or joystick, and also from a proxy device (e.g., a remote device in communication with the server 105 that allows it to select programming or data for delivery to the CPE 106), such as a mobile telephone (see, e.g., U.S. patent application Ser. No. 11/258,229 filed Oct. 24, 2005 and entitled "Method and Apparatus For On-Demand Content Transmission and Control Over Networks", previously incorporated herein).

Upon receiving the programming selection from the user or its proxy, that selection is forwarded to the VOD server 105 at step 414. At step 416, the on-demand or other programming selected by the subscriber is received and displayed. This typically takes the form of displaying the programming on a video monitor of some sort, although the present invention is not so limited. The program may also be stored for later viewing, or recorded onto a desired media. See, e.g., the techniques described in co-owned and co-pending U.S. patent application Ser. No. 11/080,693 entitled "Method and Apparatus for Network Content Download and Recording" filed Mar. 14, 2005, incorporated herein by reference in its entirety. It may also be routed to a connected device; e.g., a client device in data communication with the CPE 106 that has its own decoder and CA functionality.

The program information will typically contain the conditional access information (e.g., key stream) and video compression information that will allow the CPE (or other device) to select the correct processing to view the programming when needed, although this information can feasibly also be provided via another communications channel or from another source.

In some embodiments, the CPE 106 may receive a message indicating the network or (physical) channel on which to receive the selected programming. For example, the CPE may be instructed to receive the programming through the cable modem interface versus normal in-band downstream channels. Similarly, the CPE 106 may comprise two or more tuners which allow the receipt of multiple in-band channels. The CPE can also be instructed to receive the programming through another type network connection (e.g., WiFi, LAN, etc.) using one of the network interface modules. Hence, the CPE may receive one or more programs for viewing or storage simultaneously with the receipt of the video-on-demand programming issued by the VOD server 105.

Figure 5:
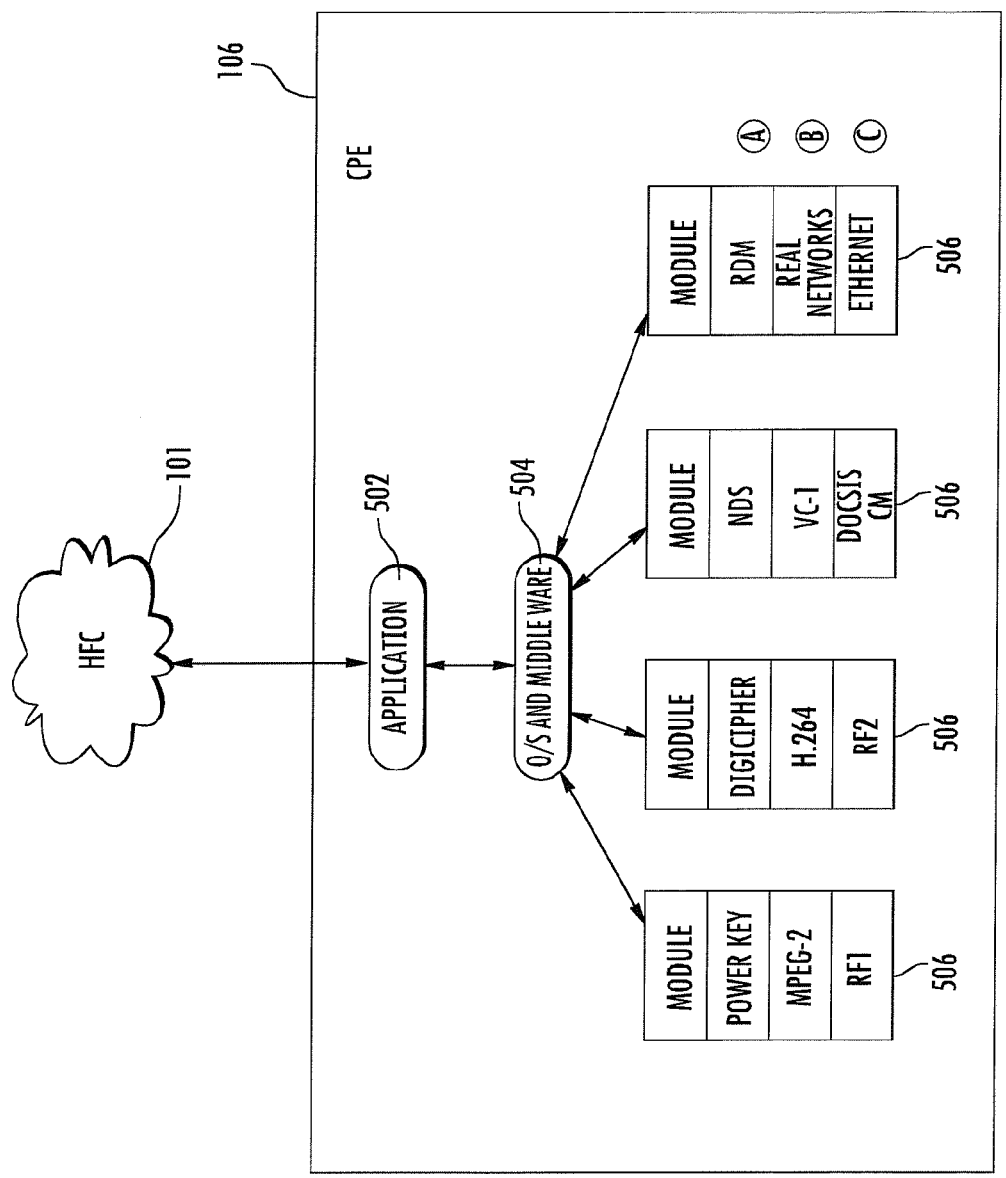
FIG. 5 is a functional block diagram illustrating the operation of CPE in gathering profile data when configured in accordance with one embodiment of the invention.

FIG. 5 is a graphical illustration of the interaction of various components within the exemplary CPE of FIG. 3 during certain embodiments of the operating methods disclosed herein. The CPE 106 (e.g., a set-top box) includes a software application 502 which interfaces with the CPE's operating system (O/S) 504. The O/S 504 interfaces with the various modules 506 (e.g., various types of conditional access or encryption, codecs, etc.). The application 502 also interfaces with the HFC network 101 (specifically other entities in communication therewith, such as a VOD server process or SRM) at a logical level.

The modules 506 can be software, firmware, or hardware modules, but will often be embodied as hardware in typical DSTB environments. These modules 506 provide additional functionality or capabilities to the CPE 106. In some instances, the modules 506 provide conditional access capabilities as described above. In other instances, modules 506 provide video decoding functionality. In still other instances, the modules 506 provide network interface functionality. Yet other uses for these functional modules will be readily apparent to those of ordinary skill.

During operation of one embodiment of the CPE 106, the application 502 generates and transmits a capabilities request message to the O/S 504. The message may be generated spontaneously by the application itself (such as upon expiration of a countdown timer or the like), or in response to an inquiry received by way of the HFC 101 (or from another system within the CPE 106, such as a "back end" communications interface such as USB, IEEE-1394, WiFi, etc.). In one embodiment of the invention, this process will involve a call made using a predefined application programming interface (API). For example, to determine the conditional access capabilities of the CPE or other device, a get_ca( ) call may be used. To determine the video decoder capabilities, a get_decoder( ) call could be used. To determine the network interfaces available, a get_network( ) call could be used.

In response to the capabilities request message, the O/S 504 polls or otherwise accesses the modules 506. For example, if the capabilities request message is for conditional access support, the O/S 504 polls each module 506 for a description or other information relating to its conditional access support capabilities. Each module responds by indicating the conditional access technologies supported back to the O/S 504.

The O/S 504 then forwards a list or other description (profile) of the conditional access technologies supported based on the reports received from the modules 506 to the application 502. The application 502 then stores the profile for later retrieval and access. The application 502 may also forward the profile information using an appropriate message interface (e.g., Session Setup Protocol (SSP) message, for example) to the VOD server process/SRM via the HFC network 101 if a capabilities request message is received. In other embodiments of the invention, the application 502 will forward the profile periodically or automatically, such as during power up or whenever a VOD programming list is requested, or according to any number of other possible algorithms of the type previously described herein.

In an exemplary embodiment of the invention, many of the steps performed in the methods described above can be implemented as signal exchanges generally fitting with the SSP protocol described in the Assignee's Pegasus Interactive Network specification, "Session Setup Protocol", Version 2.3, published May 29, 2003, which is incorporated herein by reference in its entirety. The information signal exchange between a network server and a video receipt and decoding device (e.g., CPE 106) can occur using messages described as above to follow the Pegasus SSP Resource Descriptor structure defined in the foregoing specification. In one embodiment, the signal exchanges for gathering capabilities information can occur by conveying conditional access system information, video decoder information and network interface information using a descriptor format from the Session Setup Protocol document and shown in Appendix I hereto.

It will also be recognized that the methods described herein can employ validation of conditional access. For example, it may be desirable in certain applications to use the results of the get_ca( ) call obtained from the CA modules 506 in order to verify, with the corresponding conditional access system, that the responding device belongs to the set of devices authenticated to operate within the network. This device authentication, inter alia, frustrates surreptitious attempts at gaining conditional access by non-authenticated devices ("spoofing") or the like.

Server Device

Figure 6:
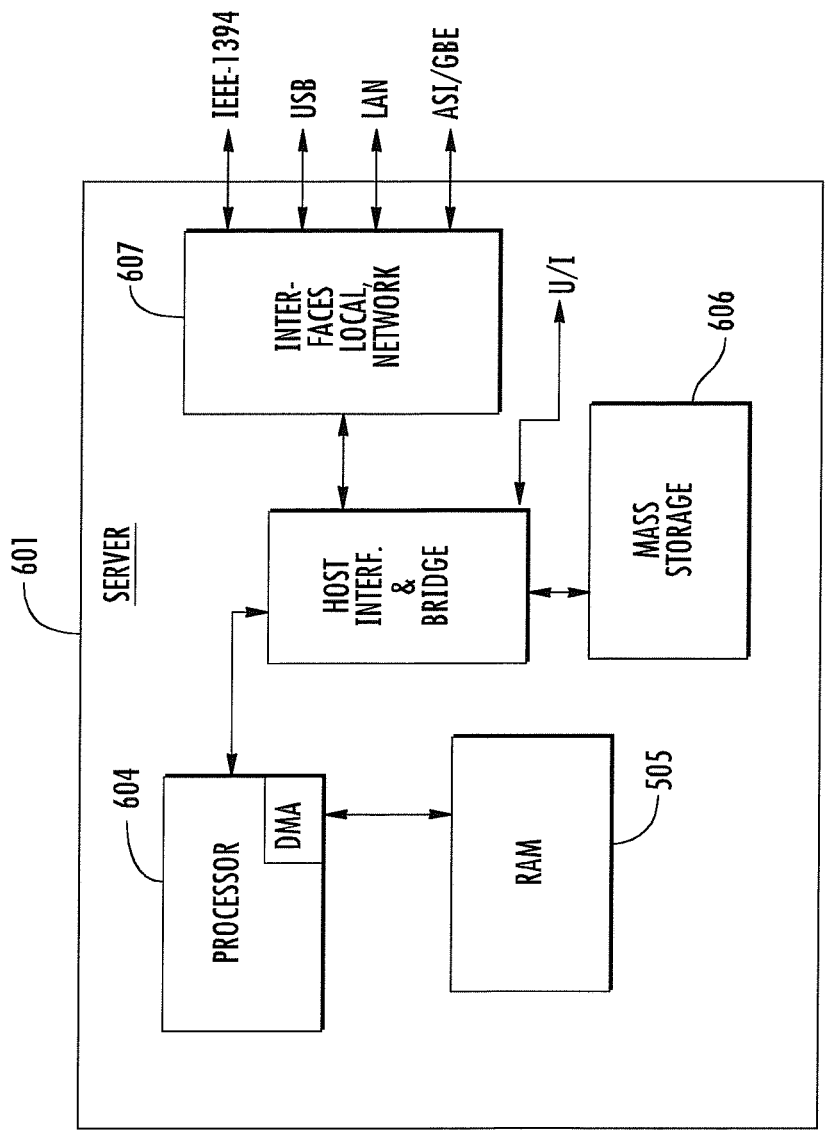
FIG. 6 is a functional block diagram of one embodiment of a network (server) device adapted for capability profile analysis and selection according to the invention.

Referring now to FIG. 6, a first embodiment of the improved network server device with digital capability selection functionality according to the present invention is described. It will be appreciated that while described in the context of a substantially centralized VOD server/SRM 105 as shown in FIG. 1, the device may be adapted for use at other locations within the network. Furthermore, as previously noted, the VOD server process (and SRM) may comprise a distributed functionality, wherein two or more portions of a distributed application (DA) in communication with one another are utilized.

As shown in FIG. 6, the exemplary server device 601 generally comprises an OpenCable-compliant network server module including a digital processor(s) 604, RAM 605, mass storage device 606, and a plurality of interfaces 607 for connection with other network apparatus such as distribution infrastructure of the VOD network, LANs, the local service node hardware, IP routers and other packet network devices, network management and provisioning systems, local PCs, etc. Other components which may be utilized within the server device 601 (depending on where the device is employed and how it is physically implemented) include RF tuner stages, modulators/demodulators, encryption/decryption, amplifiers, board level electronic components, as well as media processors and other specialized SoC or ASIC devices. Support for various processing layers and protocols (e.g., lightweight stream control protocol, or LSCP, 802.3, DOCSIS MAC, OOB channels, DHCP, SNMP, UDP, SNMP, H.323/RTP/RTCP, VoIP, SIP, etc.) may also be provided as required.

A VOD application is also disposed to run on the server module 601 to provide a functional interface for VOD session requests received from network CPE 106, or other interposed entities. These additional components and functionalities are well known to those of ordinary skill in the cable and embedded system fields, and accordingly not described further herein.

The server device 601 of FIG. 6 may take any number of physical forms, comprising for example one of a plurality of discrete modules or cards within a larger network head-end or edge device of the type well known in the art, including the MEM 162 itself. The server may also comprise firmware, either alone or in combination with other hardware/software components such as those previously described (e.g., disposed in the aforementioned edge device). Alternatively, the server module 601 may be a stand-alone device disposed at the head end or other location (such as an application server 104), and may even include its own RF front end (e.g., modulators, encryptors, etc.) or optical interface so as to interface directly with various portions of the HFC network 101.

Numerous other configurations may be used. The server device 601 may also be integrated with other types of components (such as satellite transceivers, encoders/decoders, etc.) and form factors if desired.

It can also be appreciated that the methods of the present invention may be practiced using any configuration or combination of hardware, firmware, or software, and may be disposed within one or any number of different physical or logical entities. For example, the CPE capabilities profile and program analysis functionality described above (FIG. 2) may take the form of one or more computer programs running on a single device disposed within the network (e.g., the VOD server module 105), such as at a head-end, node, or hub. Alternatively, such computer programs may have one or more components distributed across various hardware environments at the same or different locations, such as where various of the functions are distributed across the VOD servers 105, application servers 104 and Business Management System (BMS).

As yet another example, portions of the functionality may be rendered as a dedicated or application specific IC having code running thereon. Myriad different configurations for practicing the invention will be recognized by those of ordinary skill in the network arts provided the present disclosure.

"Broadcast Switched" Embodiments

In yet another embodiment, a "switched" network architecture is used in conjunction with the invention.

Figure 7A:
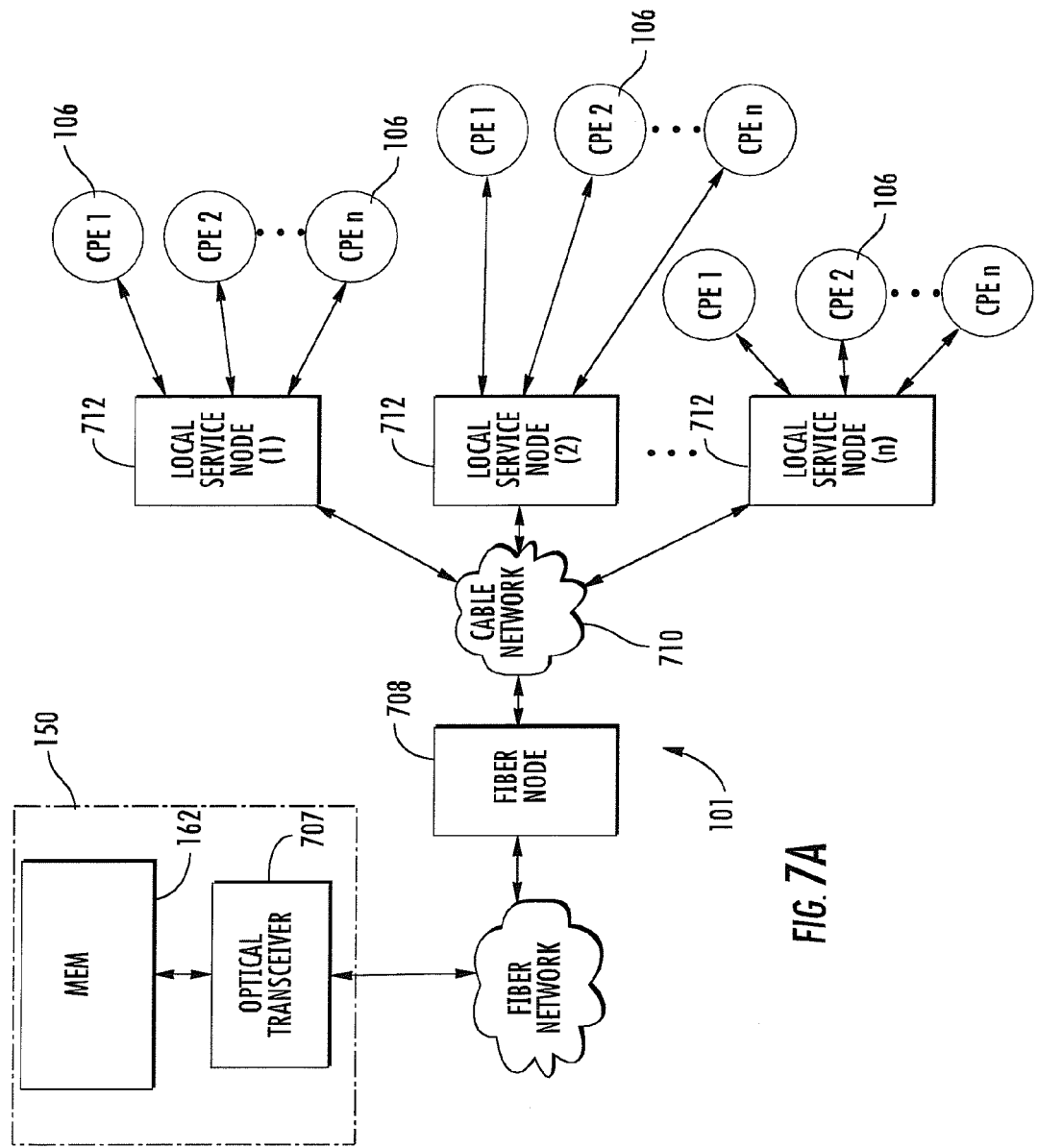
FIG. 7a is a functional block diagram illustrating one exemplary local service node configuration useful with the present invention.
Figure 7B:
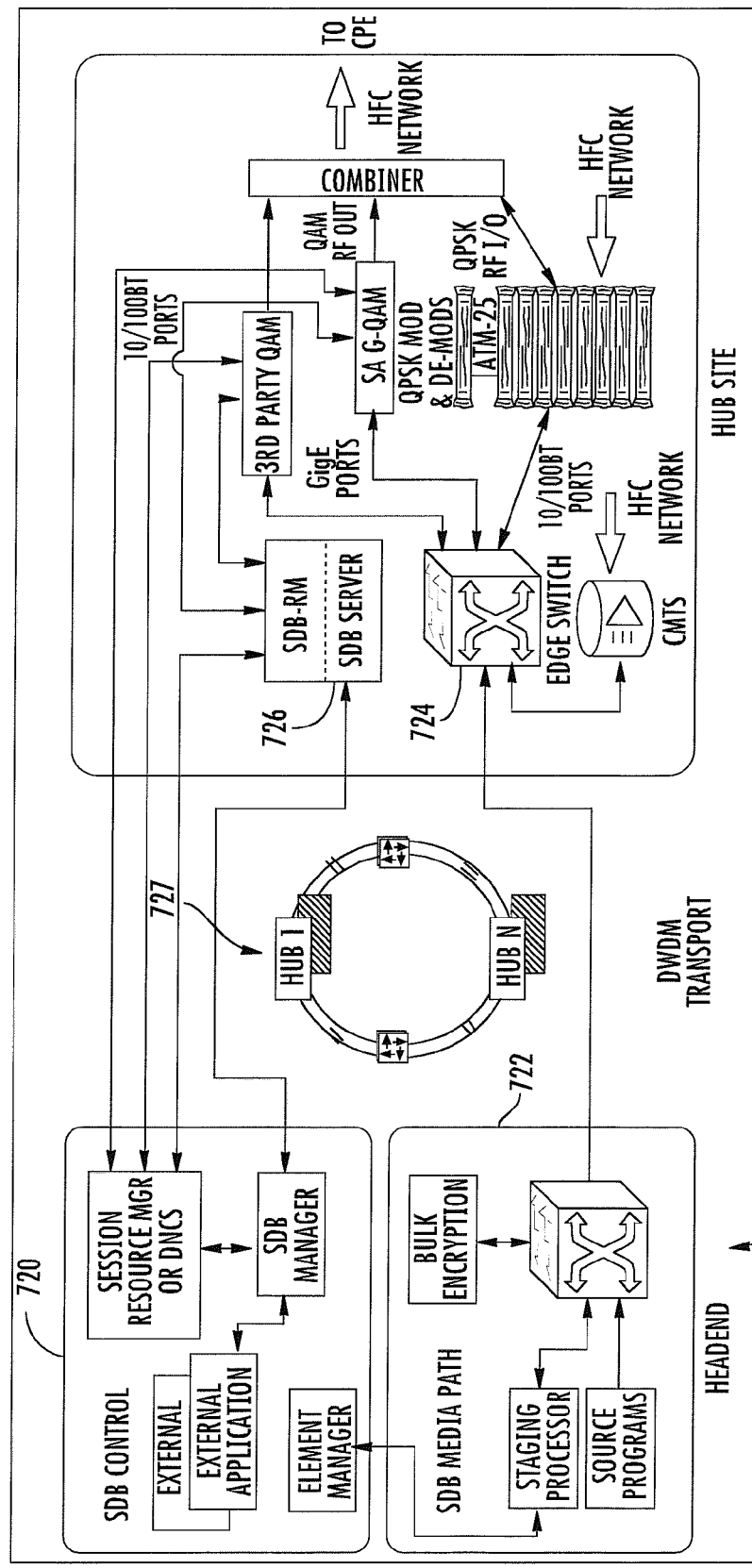
FIG. 7b is a functional block diagram illustrating one exemplary broadcast switched architecture (BSA) network useful with the present invention.

FIGS. 7a and 7b illustrate an exemplary switched network architecture. Switching architectures allow improved efficiency of bandwidth use for ordinary digital broadcast programs. Ideally, the subscriber will be unaware of any difference between programs delivered using a switched network and ordinary streaming broadcast delivery.

Specifically, as shown in FIG. 7a, the network 101 of FIGS. 1 and 1a comprises a fiber/coax arrangement wherein the output of the MEM 162 of FIG. 1a is transferred to the optical domain (such as via an optical transceiver 707 at the head-end or further downstream). The optical domain signals are then distributed to a fiber node 708, which further distributes the signals over a distribution network 710 to a plurality of local servicing nodes 712. This provides an effective 1:N expansion of the network at the local service end.

FIG. 7b shows the implementation details of one exemplary embodiment of this switched network architecture. Specifically, the head-end 150 contains switched broadcast control and media path functions 720, 722; these element cooperating to control and feed, respectively, downstream or edge switching devices 724 at the hub site which are used to selectively switch broadcast streams to various service groups. A BSA server 726 is also disposed at the hub site, and implements functions related to switching and bandwidth conservation (in conjunction with a BSA manager entity disposed at the head-end). An optical transport ring 727 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "Technique For Effectively Providing Program Material In A Cable Television System", incorporated herein by reference in its entirety, describes one exemplary switched architecture useful with the present invention, although it will be recognized by those of ordinary skill that other approaches and architectures may be substituted.

BSA programming may comprise, without limitation, simulcasts, interactive pay-per-view(IPPV), live sporting and other events, and other selected offerings. A set-top box (STB) or two-way Digital Cable Ready (e.g., CableCard) television is typically required for viewing.

In order for the BSA function to be transparent to the subscriber, channel change latencies must be kept to a minimum (e.g., 250 ms or less as compared to average linear digital broadcast services). Like the video-on-demand (VOD) systems previously described, BSA programs are streamed to a service group (contrast: switch) only when being viewed. Unlike VOD, many viewers can view the same stream. Typically, only real-time linear programs are included in BSA broadcasts. Since there is no storage involved, the "VCR" controls (e.g., trick mode functions) common to VOD are not available. In this regard, BSA is much simpler that VOD. Commercials or other programming segments cannot be skipped, and program bit rates are treated as in more conventional systems.

In the context of the aforementioned BSA network, there are several metrics or indices which are useful in evaluating the performance of the network. Specifically, the expression "peak streams" represents the maximum number of different program streams that are instantaneously (based on specified data intervals) needed as a worst case. Using software, CPE tuner addresses can be purposely or randomly assigned to service groups, and peak stream requirements can be analyzed for each group size. It has been noted by the Assignee hereof that generally speaking, as service group size is decreased, peak stream needs also decrease. When viewed over a sufficiently short time scale (e.g., two hour periods), it is possible to compare the moment-to-moment variability in peak stream use.

It has also been noted that the smaller service groups display roughly the same variability as the larger service groups. When considered as a percentage of maximum stream use, as service group size decreases, variability increases, and will impose a limit the amount of concentration that can be safely implemented within the system. Concentration in BSA is defined as a ratio of the total bandwidth of the programs offered, to the BSA bandwidth provided to the service group. While this is conveniently expressed as a ratio of stream counts, in practice streams will be of various bit rates; concentration is therefore best thought of as the ratio of the bitrates. Concentration generally (at a given grade of service or blocking frequency) trends upwards with decreasing service group size.

Another useful metric of the value of BSA is yield. Yield is a function of concentration and the total number of programs included. Yield is important to consider when comparing the value of various bandwidth reclamation techniques.

As verified by actual trials conducted by the Assignee hereof, BSA provides significant concentration, which results in the ability to vacate significant portions of the previously occupied bandwidth ("free" bandwidth yield).

Also of interest is the metric of "redundant viewership". Redundant viewers are those which view otherwise unique programs. Generally speaking, the highest number of redundant viewers occurs at prime-time or just post prime time. This is also the time of greatest total viewership and the time of highest peak stream needs. In the exemplary configuration, a design point of 70 streams would provide a non-blocking grade of service. However, significant surplus bandwidth still exists below the 70-stream level. Unfortunately, the greatest surpluses occur at times when other services (e.g., VOD) also have their lowest demands. Edge QAM resource sharing with VOD is therefore not expected to provide significant interleaving bandwidth gains. However, the BSA system can be advantageously operated to allow this surplus bandwidth to be utilized in other ways, such as for transport of data, video, voice, or even future applications which would require additional bandwidth.

Gain is a useful parameter for comparison of BSA with statistical multiplexing technology. In BSA, percent gain is defined as:

$$(\text{Concentration}-1) \times 100 \qquad \text{Eqn. (1)}$$

In this context, content that occupies the "freed up" spectrum is assumed to operate with the same level of efficiency as the content being processed (i.e. switched under the BSA architecture, or alternatively statistically multiplexed).

A primary advantage of the BSA paradigm is bandwidth conservation/preservation. Bandwidth for unviewed programs is not consumed, and can be re-allocated. Similarly, new programs can be added without adding bandwidth. Advantageously, programs with narrow appeal can be added in a BSA system with little if any bandwidth impact. More popular programs will impact the BSA bandwidth, but to a lesser extent than was traditionally the case. Multiple bit. rates can also be made available for use or sale to programmers or advertisers.

BSA bandwidth efficiencies are at least in part a result of over-subscription. Specifically, the selection of programming is greater than the bandwidth allocated to the service group. This can result in blocking, the case where a viewer is denied access to a requested program. However, the aforementioned trials conducted by the Assignee hereof demonstrate that when properly configured, blocking events are sufficiently rare, so as to be less common than a network outage, thereby providing a sufficient level of service.

Additionally, a BSA system must typically gather and keep logs or other records of programmer-specific viewership data in order to function. These logs or records are maintained to allow for well-considered "recapture" of non-viewed program streams (i.e., reclamation of bandwidth). The server manages bandwidth by removing streams based on this activity data. In typical practice, unviewed streams will be marked, but not actually removed until the bandwidth is needed either because of a client request, or based on external resource demands such as VOD overflow.

In one exemplary embodiment, the network switch 724 (FIG. 7b) logs all channel change events and is aware of the tuning locations of all tuners, not just those that happen to be viewing BSA programs. This provides highly accurate and complete viewership data based on actual channel changes as contrasted with extrapolations or other estimation techniques.

It is often an important factor to maintain subscriber privacy, for both legal and commercial reasons. Accordingly, subscriber identities may be protected by hashing or encryption of the tuner address prior to logging and storage. The stored address and associated events are therefore not traceable to the user account. The resulting obscured tuner address is repeatable so the necessary tuning location and user activity tracking may be performed while still maintaining complete anonymity.

In the exemplary embodiment of the present invention, the edge switch 724 (generally located in the distribution hub as shown in FIG. 7b) is flooded with all available programs. This improves transport efficiency, because a simple unidirectional "drop and continue" protocol is performed at each hub location on a given optical transport ring 727. The concept of flooding also simplifies the transport network in that no control system is needed; rather a simple "deliver everything" paradigm is used. This approach also advantageously makes this portion of the signal chain more robust, since more complex control systems generally lend themselves to a higher operational failure rate.

Because ordinary broadcast programming is supplied using BSA, the transport network 727 needs to have a high degree of availability. In the exemplary embodiment, BSA program transport is supplied through a redundant, spatially diverse counter-rotating Ethernet ring topology, although other topologies may be utilized with success.

In one embodiment of the invention, the different codecs, network interfaces, and/or CA modules within different CPE 106 may be used as a basis for BSA switching decisions and/or operation. Specifically, the switch/hub operation can consider CPE capability information as well as other parameters as part of the switching logic. For example, information relating to whether anyone is capable of watching a given program stream on a hub or other node may be used as an input to the switching algorithm. As a simple illustration, the aforementioned polling of the CPE 106 associated with a node or hub may return CPE profiles that indicate that none of the CPE on that hub have MPEG-4 decoders. Hence, delivery of any MPEG-4 encoded content to that hub would be a waste of bandwidth, since no one on that hub will ever select that MPEG-4 encoded program stream. This information can be used by the switch 726 or similar entity (e.g., supervisory process or rules engine that controls the switch) to avoid switching MPEG-4 encoded program streams to that hub, thereby conserving bandwidth.

The foregoing approach can also be extended to CPE 106 that are active at a given point in time; i.e., while MPEG-4 capable CPE may be associated with a given hub, if they are not active or powered up, then there will again be no need for MPEG-4 encoded program delivery, until such CPE is actually switched on or activated (thereby enabling the subscriber to actually select that MPEG-4 program). Similarly, the subscriber's affirmative act of selecting an MPEG-4 encoded program may be used as the (a) basis of switching, such as where the MPEG-4 encoded variant of a program stream is only delivered to the hub upon actual selection by one or more subscribers having MPEG-4 encoders on that hub.

The foregoing approaches are also readily employed with respect to CA and network interface configurations of the CPE, whether alone or in combination with one another. For example, templates or masks can be used wherein switching decisions are made based on compliance by one or more CPE within the hub/service group with a pre-stored or ad hoc masking function, such as where a given program stream will be switched to the relevant hub when both a given codec and CA profile are present.

In another embodiment, the BSA switching process can be made "CPE-centric", such that switching decisions or portions of the switching logic can be performed at the CPE. For example, a given CPE might be provided with a complete list of available programming and, using an installed client application such as that previously described herein, mask out certain portions of the available content or programming list based on CPE indigenous capabilities. The unmasked (or alternatively masked) portions of the list can then be provided to the switch 726 or other supervisory process, such as via upstream signaling or message, to be used in the switching algorithm. The switch 726 or supervisory process can, for example, use this information to identify those programs for which no codec, CA, and/or interface support is provided within the CPE of that hub, and hence which can be deleted from the program lineup for that hub.

Other features useful with such broadcast switched networks may also be used consistent with the features and functions of the present invention. For example, the efficient network multicasting apparatus and techniques described in co-owned and co-pending U.S. patent application Ser. No. 11/325,107 filed Jan. 3, 2006 and entitled "Methods and Apparatus For Efficient IP Multicasting in a Content-Based Network" incorporated herein by reference in its entirety, may be used to provide, inter alia, both efficient delivery of multicast content and efficient network operation (switching) based on subscriber STB configuration or other such parameters. For example, where an IP multicast is destined for two CPE within the same service group, one of the CPE can be tuned to the appropriate CM QAM, thereby freeing QAM resources. This logic is overlaid onto the decision of whether to even deliver the multicast to that service group (e.g., wherein none of the CPE in that group have an appropriate decoder or CM interface necessary to receive and decode the multicast content).

Similarly, the apparatus and methods for selective delivery of targeted content to individual ones or subsets of CPE within a switched network described in co-owned and co-pending U.S. patent application Ser. No. 11/186,452 filed Jul. 20, 2005 and entitled "Method and Apparatus for Boundary-Based Network Operation", incorporated herein by reference in its entirety, may be used to provide, inter alia, both targeted delivery of content and efficient network operation (switching) based on subscriber STB configuration or other such parameters. For example, decisions of whether to switch a given program to a node may be based on both targeting criteria (e.g., whether a given CPE is even within a target group of subscribers) and the CPE capabilities/profile for CPE within that node.

Similarly, the anticipatory network allocation and control apparatus and techniques described in co-owned and co-pending U.S. patent application Ser. No. 11/243,720 filed Oct. 4, 2005 and entitled "Self-Monitoring and Optimizing Network Apparatus and Methods" incorporated herein by reference in its entirety, may be used to provide, inter alia, efficient network operation (switching) based on both anticipated network and STB operational parameters as well as subscriber STB configuration and requirements.

Moreover, the vacated bandwidth "stuffing" and extraction apparatus and techniques described in co-owned and co-pending U.S. patent application Ser. No. 11/291,328 filed Nov. 30, 2005 entitled "Apparatus and Methods for Utilizing Variable Rate Program Streams in a Network", incorporated herein by reference in its entirety, may be used to provide, inter alia, loading of non-time sensitive secondary content onto QAMs, as well as efficient network operation (switching) based on subscriber CPE configuration and requirements. For example, the CPE configuration might be used by the "stuffing" algorithms and control process to determine which types of secondary content can be inserted (and subsequently extracted) into one or more program streams having vacated bandwidth. Similarly, switching decisions can be predicated at least in part based on the need to insert secondary content, such as where the number of QAMs loaded for a service group is altered in order to make the creation of vacated bandwidth possible or more likely.

Operations/Business Rules and Methods

In another aspect of the invention, the aforementioned processing entity (e.g., rendered as one or more computer programs disposed on the VOD server/SRM, CPE 106, or other location) includes a so-called "rules" engine. This engine comprises, in an exemplary embodiment, a series of software routines adapted to control the operation of the capability profile, analysis and selection (and even component distribution) algorithms previously described. These rules may comprise a separate entity or process, and may also be fully integrated within the processing entity 252 (FIG. 2a) itself, and controlled via e.g., a GUI on a PC connected to the server 105. In effect, the rules engine comprises a supervisory entity which monitors and selectively controls via the processing entity 252 the CPE profiling, analysis, and program selection and distribution processes at a higher level, so as to implement desired operational or business rules. The rules engine can be considered an overlay of sorts to the profiling and analysis algorithms.

For example, the processing entity 252 may invoke certain operational protocols or decision processes based on profiles or requests received from the CPE, conditions existing within the network, demographic data, geographic data, etc. However, these processes may not always be compatible with higher level business or operational goals, such as maximizing profit or system reliability. Hence, when imposed, the business/operational rules can be used to dynamically (or manually) control the operation of the processing entity 252 (and even the associated client process 254 on the CPE). The rules may be, e.g., operational or business-oriented in nature, and may also be applied selectively in terms of time of day, duration, specific local areas, or even at the individual user level (e.g., via specific identification of the CPE or client device via TUNER_ID, MAC address, or the like).

For example, one rule implemented by the rules engine may comprise only providing certain types or formats of programming to certain subscribers or classes of subscribers. Subscriber CPE may possess an MPEG-4 decoder, for example, but programs rendered in MPEG-4 encoding would not be made available to such subscribers unless they met certain criteria (e.g., "premium" subscription, etc.). Similarly, if the subscriber did not possess a required codec, CA keys, or network interface, the download of this missing component could be controlled to only subscribers meeting certain criteria.

Another rule might impose a moratorium or restrictions on upstream profile messages (e.g., SSP) from the CPE during conditions of very heavy loading (e.g., until a certain minimum threshold of available bandwidth is present), thereby avoiding contention for bandwidth resources with "premium" services. Similarly, the profile and program processing could be dynamically shifted to the CPE under such circumstances so as distribute the processing load (and hence upstream messaging bandwidth consumed) to the CPE, as previously discussed herein.

Yet another rule might impose restrictions on establishing or allocating new physical channels/QAMs to the subscriber channel requests based on CPE profile data (e.g., the presence of a certain required codec, CA, etc.). As previously discussed, bandwidth/QAM resource allocation and other relevant network considerations may be used as a basis of implementing or modifying user program requests in a broadcast switched network. For example, where a subscriber has both high-bandwidth and low-bandwidth codecs available on their CPE, and they request the high-bandwidth variant of a given program, QAM resource allocation within the network can be evaluated, and the user's selection modified to implement the lower-bandwidth program in cases where QAM loading to that hub is high. This process can also be made dynamic if desired; such as where QAM loading and similar parameters can be continuously or periodically re-evaluated, and the operation of the network (including which program stream is delivered to a subscriber) altered accordingly. For example, when sufficient bandwidth is again present, the subscriber of the previous example may be switched over to a program stream associated with the higher bandwidth codec.

In another aspect of the invention, business methods based on the foregoing profiling, analysis and selection functions are disclosed. In one such method, a vendor of a particular codec may want to advertise to subscribers the enhancements afforded by use of their codec (i.e., the content they are missing because they do not have the vendor's codec installed on their CPE or client device). The MSO may also enter into a relationship with the codec, etc. vendor to provide the codec either via the MSO network, or an alternate channel (e.g., Internet download).

Furthermore, proprietary icons or symbols may be used on the available program listing (e.g., EPG) to indicate certain capabilities or compatibility for certain content. Hence the subscriber can instantly know that a given program is encoded with a given codec for example, somewhat akin to the well known use of proprietary microprocessor logos on the outside and packaging of PCs to indicate that a certain type of microprocessor is used. This association provides tangible benefits to the content provider and MSO (as well as the codec provider).

Many other approaches and combinations of various operational and business paradigms are envisaged consistent with the invention, as will be recognized by those of ordinary skill when provided this disclosure.

Thus, methods and apparatus for selecting digital technology for programming and data delivery has been described. Many other permutations of the foregoing system components and communication methods may also be used consistent with the present invention, as will be recognized by those of ordinary skill in the field.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A system for distribution of video programming on-demand, comprising:
   a plurality of video signal processing devices, each of said plurality of devices having a respective plurality of network interface capabilities, and each configured to: (i) generate a capabilities profile related at least in part to said plurality of network interface capabilities, (ii) receive video programming signals, and (iii) select an optimal network interface to be used based at least in part on one or more internal parameters; and
   a video-on-demand server connected to said plurality of video signal processing devices over a network, said video-on-demand server configured to: (i) receive individual capabilities profiles from individual ones of said plurality of video signal processing devices, (ii) identify on-demand video programming that is compatible with said individual ones of said plurality of devices, said identification comprising evaluation of: data decoding capabilities; and conditional access capabilities, (iii) transmit said compatible on-demand video to said individual ones of said plurality of devices, and (iv) transmit one or more components needed by a requesting device for compatibility when compatible on-demand video programming cannot be identified.

2. The system of claim 1, wherein said identification of on-demand programming by said video-on-demand server comprises evaluation of said plurality of network interface capabilities for sufficient bandwidth for delivery of said video programming.

3. The system of claim 1, wherein at least one of said plurality of video processing devices further comprises a digital processor configured to run a computer program thereon, said computer program comprising an operating system and an application component, said application component being configured to, when executed, request a capabilities profile from said at least one of said plurality of devices, and said operating system being configured to, when executed, poll at least one hardware or software module.

4. The system of claim 1, wherein said network comprises a hybrid fiber coaxial (HFC) cable television network, and at least a portion of said plurality of devices have heterogeneous network interface capabilities.

5. A method for operating a video processing device for use in a content delivery network, comprising:
   polling a set of components of said video processing device for network interface capabilities and conditional access capabilities, said act of polling occurring at the video processing device;
   receiving one or more network interface capabilities and conditional access capabilities in response to said polling;
   generating information describing said one or more network interface capabilities; and
   selecting, at said video processing device, a network interface for receipt of content based at least in part on said one or more network interface capabilities.

6. The method of claim 5, further comprising transmitting a session-based protocol message to a session resource manager (SRM) located on said content delivery network remote from said video processing device.

7. The method of claim 6, wherein said session-based protocol message comprises:
   a descriptor parameter describing a particular resource descriptor;
   a descriptor length parameter; and
   a data field.

8. The method of claim 5, wherein said one or more network interface capabilities comprise at least one of (i) an in-band radio frequency (RF) tuner; (ii) a cable modem; and (iii) a high-speed serialized bus connection.

9. The method of claim 5, further comprising:
   receiving a list of programs available for video-on-demand viewing, said list selected based at least in part on said act of generating information;
   displaying said list of programs to a user;
   receiving a selection from said user;
   transmitting said selection;
   receiving video programming;
   accessing said video programming based at least in part on one of said one or more network interface capabilities; and
   displaying said video programming.

10. The method of claim 5, further comprising transmitting a message to a software process configured to control at least in part a delivery of program streams to a node within a broadcast switched architecture (BSA) network.

11. An apparatus for receipt of digital information from a network, said digital information being encoded, said apparatus comprising a microprocessor configured to run software modules, said apparatus further comprising:
a plurality of network interface components, each comprising a distinct communication channel;
an application configured to determine a network interface profile; and
an operating system configured to communicate with said plurality of network interface components in order to generate information for said network interface profile;
wherein said application is further configured to utilize at least (i) information related to conditional access capabilities of said apparatus, and (ii) information related to current network conditions, in order to select one of said plurality of network interface components; and
wherein said network interface profile comprises a prioritized list of available ones of said plurality of network interface components, said prioritization thereof based at least in part on information related to said internal parameters and said information related to said current network conditions.

12. The apparatus of claim 11, wherein said plurality of network interface components comprises a plurality of hardware-based interfaces and an associated registry.

13. The apparatus of claim 11, wherein said application is further configured to generate and transmit a network interface capability message via a session-based protocol.

14. The apparatus of claim 11, wherein said network interface components comprise one or more of: (i) radio frequency (RF) tuners, and (ii) packetized network protocol interfaces.

15. The apparatus of claim 11, further comprising a radio frequency (RF) interface configured to receive modulated digital RE signals.

16. The apparatus of claim 15, wherein said application is rendered via an object oriented programming language.

17. The apparatus of claim 11, wherein said apparatus comprises a set-top box adapted for use in a cable television network.

18. The apparatus of claim 11, wherein said apparatus is at least in data communication with a Data Over Cable Service Interface Specification (DOCSIS) cable modem configured for use in a cable television network.

19. A network server apparatus, comprising:
a storage device; and
a processor in data communication with said storage device, said processor configured to run a computer program thereon, said program comprising a plurality of instructions configured to, when executed:
receive network interface profile and capabilities profile information from a plurality of network client devices;
receive a request for first content from at least two of said plurality of network client devices;
determine whether a common network interface profile exists between said at least two of said plurality of network client devices;
identify programming that is compatible with said at least two client devices; and
in response to a determination that said common network interface profile exists, utilize a bandwidth-conserving content delivery mechanism for delivery of said identified compatible programming to said at least two of said plurality of network client devices;
wherein said identified compatible programming is selected based at least in part on an evaluation of: (i) decoding capabilities, and (ii) conditional access capabilities.

20. The server apparatus of claim 19, wherein said network server apparatus is in data communication with a cable network, and said network server further comprises a server process associated with a video-on-demand function of said cable network.

21. The server apparatus of claim 19, wherein said bandwidth-conserving content delivery mechanism comprises a multicast transmission via a packetized network protocol.

22. A method of configuring programming deliverable over a network that is available for on-demand viewing by at least one Customer Premises Equipment (CPE), said method comprising:
receiving, from said at least one CPE, first information relating to a prioritized list of available network interface options of said at least one CPE over which said programming is to be delivered, a priority of said prioritized list being determined by current network conditions;
receiving from said at least one CPE second information relating to conditional access (CA) capabilities, of said at least one CPE;
selecting at least one of a plurality of variants of said programming based at least in part on said second information; and
transmitting said selected at least one of said plurality of said variants of said programming over a first network interface based at least in part on said prioritized list;
wherein a mode associated with said transmission reduces bandwidth consumption during said transmission.

23. The method of claim 22, wherein said available network interface options comprise at least one of: (i) an in-band radio frequency (RF) tuner; (ii) a cable modem; and (iii) a high-speed serialized bus connection.

24. The method of claim 23, further comprising:
receiving a list of programs available for video-on-demand viewing, said list selected based at least in part on said second information;
displaying said list of programs to a user;
receiving a selection from said user;
transmitting said user selection;
receiving video programming;
accessing said video programming based at least in part on one of said one or more network interface options; and
displaying said video programming.

25. The method of claim 22, further comprising transmitting a message to a software process configured to control at least in part a delivery of program streams to a node within a broadcast switched architecture (BSA) network.

26. The method of claim 22, wherein said prioritized list of available network interface options is transmitted via a session-based protocol message.

27. The method of claim 26, wherein said session-based protocol message comprises:
a descriptor parameter describing a particular resource descriptor;
a descriptor length parameter; and
a data field.

* * * * *